(12) United States Patent
Dale et al.

(10) Patent No.: US 8,046,574 B2
(45) Date of Patent: Oct. 25, 2011

(54) SECURE BOOT ACROSS A PLURALITY OF PROCESSORS

(75) Inventors: Jason N. Dale, Austin, TX (US);
Jonathan J. DeMent, Austin, TX (US);
Clark M. O'Niell, White Plains, NY (US); Christopher J. Spandikow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 12/130,185

(22) Filed: May 30, 2008

(65) Prior Publication Data
US 2008/0229092 A1    Sep. 18, 2008

Related U.S. Application Data

(63) Continuation of application No. 11/423,342, filed on Jun. 9, 2006, now abandoned.

(51) Int. Cl.
*G06F 9/00* (2006.01)
*G06F 15/177* (2006.01)
(52) U.S. Cl. .......................................................... 713/2
(58) Field of Classification Search ................... 713/2
See application file for complete search history.

(56) References Cited

U.S. PATENT DOCUMENTS

| | | | |
|---|---|---|---|
| 5,555,373 A | 9/1996 | Dayan et al. | |
| 5,675,772 A * | 10/1997 | Liu et al. | 703/27 |
| 5,937,063 A | 8/1999 | Davis | |
| 6,141,756 A | 10/2000 | Bright et al. | |
| 6,192,475 B1 | 2/2001 | Wallace | |
| 6,282,601 B1 | 8/2001 | Goodman et al. | |
| 6,347,372 B1 | 2/2002 | Takashima et al. | |
| 6,415,348 B1 | 7/2002 | Mergard et al. | |
| 6,473,857 B1 * | 10/2002 | Panas et al. | 713/2 |
| 6,532,538 B1 * | 3/2003 | Cronk et al. | 713/2 |
| 6,550,019 B1 | 4/2003 | Ahrens et al. | |
| 6,578,131 B1 | 6/2003 | Larson et al. | |
| 6,641,050 B2 | 11/2003 | Kelley et al. | |
| 6,694,435 B2 | 2/2004 | Kiddy | |

(Continued)

FOREIGN PATENT DOCUMENTS

CN    1659516 A    8/2005

OTHER PUBLICATIONS

USPTO U.S. Appl. No. 11/423,304, Image File Wrapper on Mar. 16, 2010, 2 pages.

(Continued)

*Primary Examiner* — Mohammed Rehman
(74) *Attorney, Agent, or Firm* — Stephen R. Tkacs; Stephen J. Walder, Jr.; Matthew B. Talpis

(57) ABSTRACT

Boot code is partitioned into a plurality of boot code partitions. Processors of a multiprocessor system are selected to be boot processors and are each provided with a boot code partition to execute in a predetermined boot code sequence. Each processor executes its boot code partition in accordance with the boot code sequence and signals to a next processor the successful and uncompromised execution of its boot code partition. If any of the processors does not signal successful completion and/or uncompromised execution of its boot code partition, the boot operation fails. The processors may be arranged, with regard to the boot operation, in a daisy chain, ring, or master/slave arrangement, for example.

16 Claims, 9 Drawing Sheets

U.S. PATENT DOCUMENTS

| | | |
|---|---|---|
| 6,738,478 B1 | 5/2004 | Vanstone et al. |
| 6,754,818 B1 | 6/2004 | Lee et al. |
| 6,839,849 B1 | 1/2005 | Ugon et al. |
| 7,036,023 B2 | 4/2006 | Fries et al. |
| 7,065,654 B1 | 6/2006 | Gulick et al. |
| 7,082,542 B2 | 7/2006 | Cooper |
| 7,092,523 B2 | 8/2006 | Pezeshki et al. |
| 7,200,772 B2 | 4/2007 | Datta et al. |
| 7,313,677 B2 | 12/2007 | Piry |
| 7,337,314 B2 | 2/2008 | Hussain et al. |
| 7,424,500 B2 | 9/2008 | Fukushima et al. |
| 7,424,620 B2 | 9/2008 | de Jong |
| 7,426,629 B2 | 9/2008 | Piry et al. |
| 7,426,749 B2 | 9/2008 | Gerard |
| 7,500,112 B1 | 3/2009 | Wille et al. |
| 7,506,381 B2 * | 3/2009 | Sormunen et al. ............. 726/30 |
| 7,562,211 B2 * | 7/2009 | Paya et al. .................... 713/151 |
| 7,594,104 B2 | 9/2009 | Dale et al. |
| 7,627,781 B2 * | 12/2009 | Michaelis et al. ............. 714/13 |
| 7,684,833 B2 | 3/2010 | Marschalkowski et al. |
| 7,822,995 B2 | 10/2010 | Hars et al. |
| 2002/0029346 A1 | 3/2002 | Pezeshki et al. |
| 2002/0124178 A1 | 9/2002 | Kocher et al. |
| 2002/0156819 A1 | 10/2002 | Oerlemans |
| 2003/0023859 A1 | 1/2003 | Kiddy |
| 2003/0037093 A1 | 2/2003 | Bhat et al. |
| 2003/0056107 A1 | 3/2003 | Cammack et al. |
| 2003/0188144 A1 | 10/2003 | Du et al. |
| 2004/0025032 A1 | 2/2004 | Chow et al. |
| 2004/0039928 A1 | 2/2004 | Elbe et al. |
| 2004/0078588 A1 | 4/2004 | Chow et al. |
| 2004/0199786 A1 | 10/2004 | Walmsley et al. |
| 2004/0255172 A1 | 12/2004 | Dayan et al. |
| 2005/0004960 A1 | 1/2005 | Hars |
| 2005/0021944 A1 | 1/2005 | Craft et al. |
| 2005/0160255 A1 | 7/2005 | Obitsu et al. |
| 2005/0182952 A1 | 8/2005 | Shinozaki |
| 2005/0271202 A1 | 12/2005 | Shu et al. |
| 2005/0273630 A1 | 12/2005 | Shu et al. |
| 2005/0273631 A1 | 12/2005 | Shu et al. |
| 2006/0036833 A1 | 2/2006 | Piry et al. |
| 2006/0090084 A1 | 4/2006 | Buer |
| 2006/0117167 A1 | 6/2006 | Evrard et al. |
| 2006/0129848 A1 | 6/2006 | Paksoy et al. |
| 2006/0155962 A1 | 7/2006 | Piry |
| 2006/0179302 A1 | 8/2006 | Hatakeyama |
| 2007/0071233 A1 | 3/2007 | Zak |
| 2007/0079150 A1 | 4/2007 | Belmont et al. |
| 2007/0118837 A1 | 5/2007 | Doing et al. |
| 2007/0250691 A1 | 10/2007 | Cool et al. |
| 2007/0288738 A1 | 12/2007 | Dale et al. |
| 2007/0288739 A1 | 12/2007 | Dale et al. |
| 2007/0288761 A1 | 12/2007 | Dale et al. |
| 2007/0288762 A1 | 12/2007 | Dale et al. |
| 2007/0300053 A1 | 12/2007 | Dale et al. |
| 2008/0215874 A1 | 9/2008 | Dale et al. |
| 2008/0256366 A1 | 10/2008 | Dale et al. |
| 2009/0055640 A1 | 2/2009 | Dale et al. |

OTHER PUBLICATIONS

USPTO U.S. Appl. No. 11/423,312, Image File Wrapper on Mar. 16, 2010, 2 pages.
USPTO U.S. Appl. No. 11/423,320, Image File Wrapper on Mar. 16, 2010, 2 pages.
USPTO U.S. Appl. No. 11/423,330, Image File Wrapper on Mar. 16, 2010, 1 page.
USPTO U.S. Appl. No. 11/423,336, Image File Wrapper on Mar. 16, 2010, 2 pages.
USPTO U.S. Appl. No. 11/423,342, Image File Wrapper printed on Mar. 16, 2010, 2 pages.
USPTO U.S. Appl. No. 12/120,808, Image File Wrapper printed on Mar. 16, 2010, 2 pages.
USPTO U.S. Appl. No. 12/120,847, Image File Wrapper printed on Mar. 16, 2010, 2 pages.
USPTO U.S. Appl. No. 12/130,105, Image File Wrapper printed on Mar. 16, 2010, 1 page.
USPTO U.S. Appl. No. 12/130,128, Image File Wrapper printed on Mar. 16, 2010, 1 page.
Office Action mailed Jan. 24, 2011 for U.S. Appl. No. 12/130,128; 22 pages.
Office Action mailed Dec. 7, 2010 for U.S. Appl. No. 12/130,105; 16 pages.
Response to Office Action filed with the USPTO on Mar. 4, 2011 for U.S. Appl. No. 12/130,105; 10 pages.
Notice of Allowance mailed May 3, 2011 for U.S. Appl. No. 12/130,105; 9 pages.
Notice of Allowance mailed Jun. 9, 2011 for U.S. Appl. No. 12/130,128; 6 pages.
Response to Office Action filed Apr. 25, 2011, U.S. Appl. No. 12/130,128, 9 pages.
Terminal Disclaimer filed Apr. 21, 2011, U.S. Appl. No. 12/130,105, 1 page.

* cited by examiner

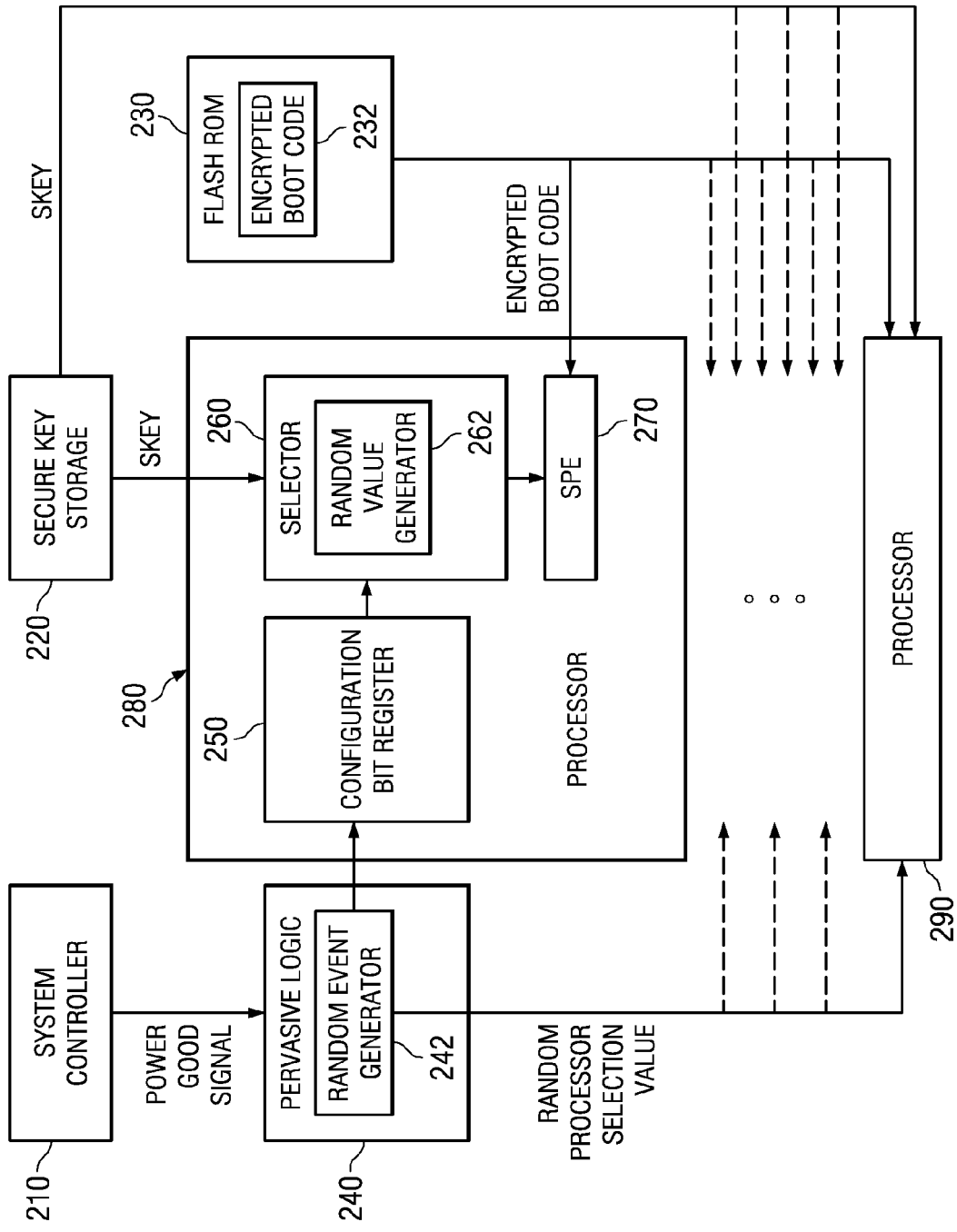

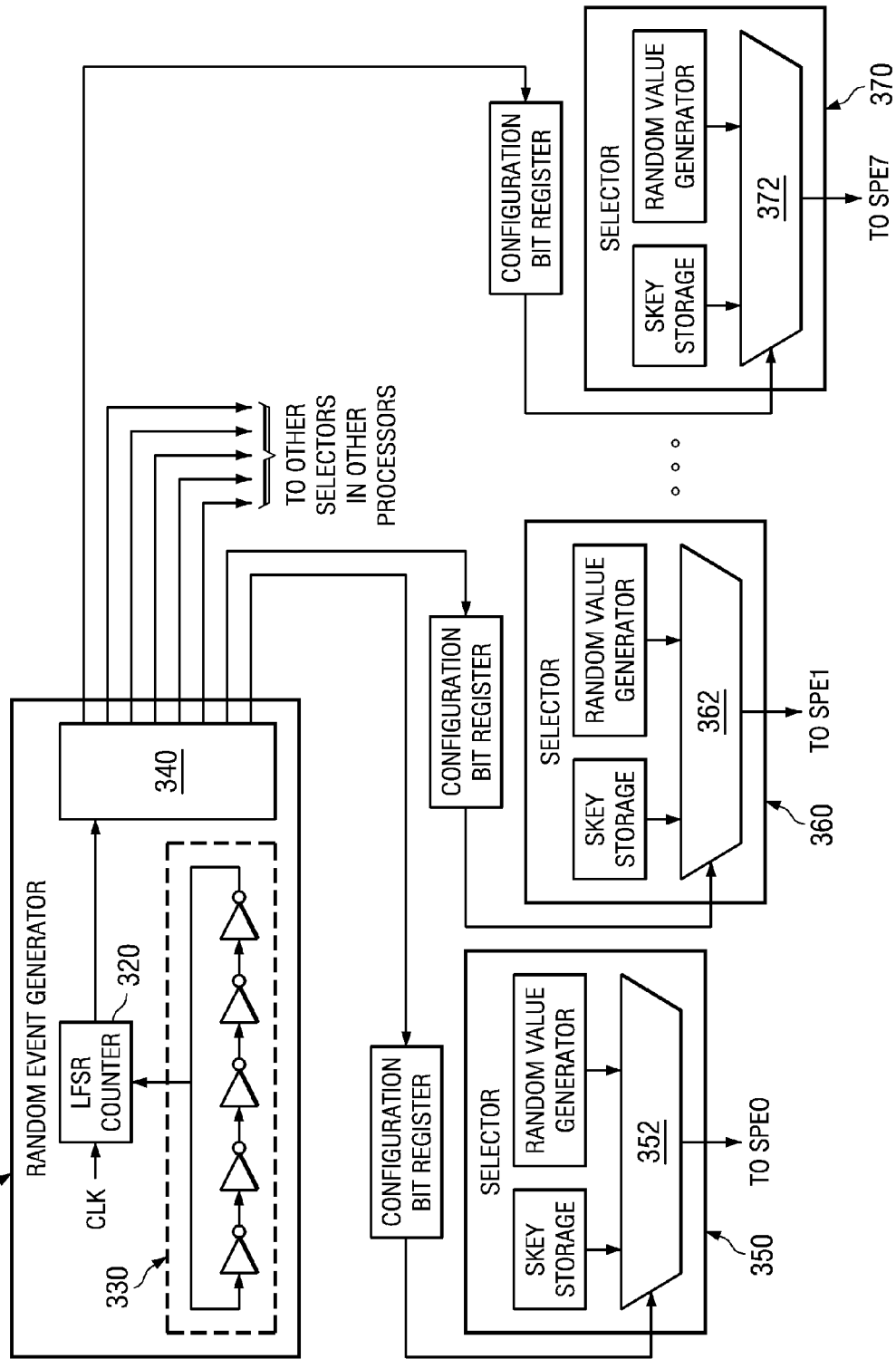

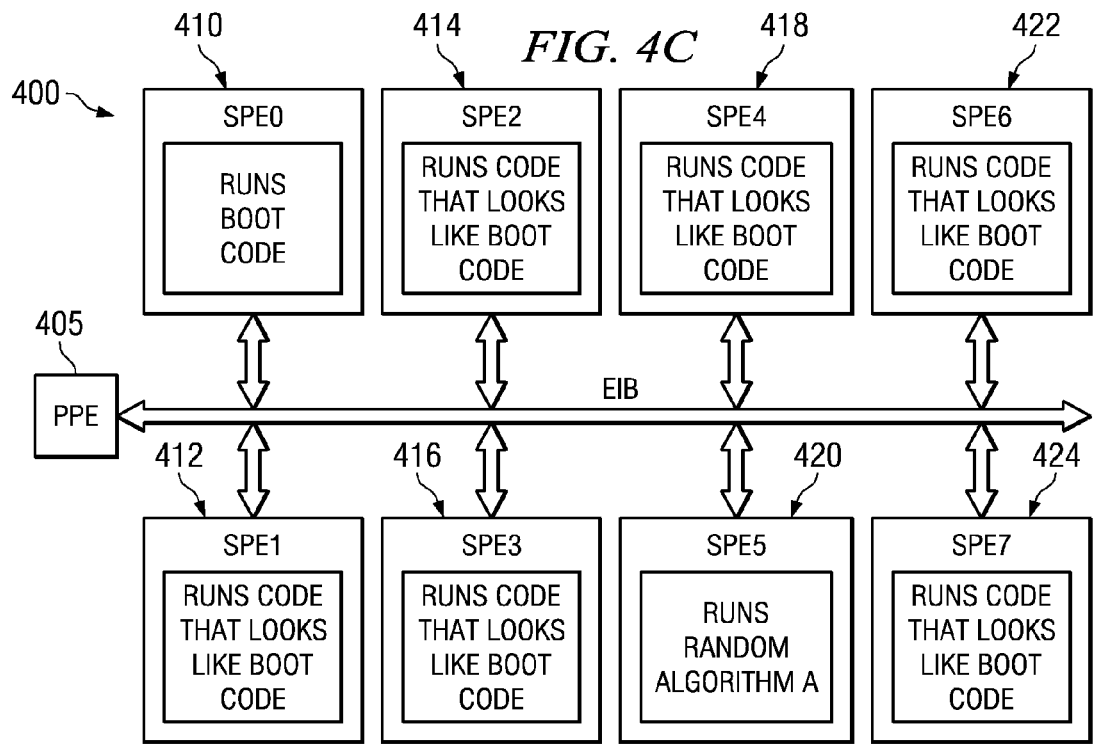
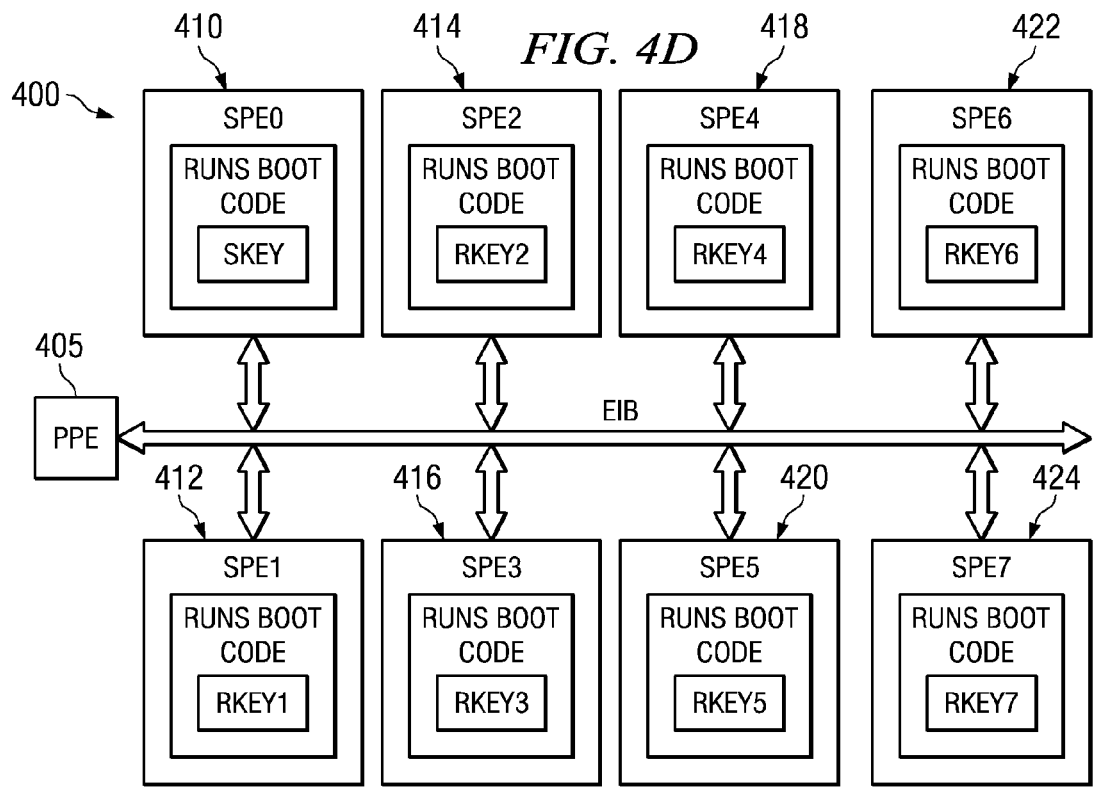

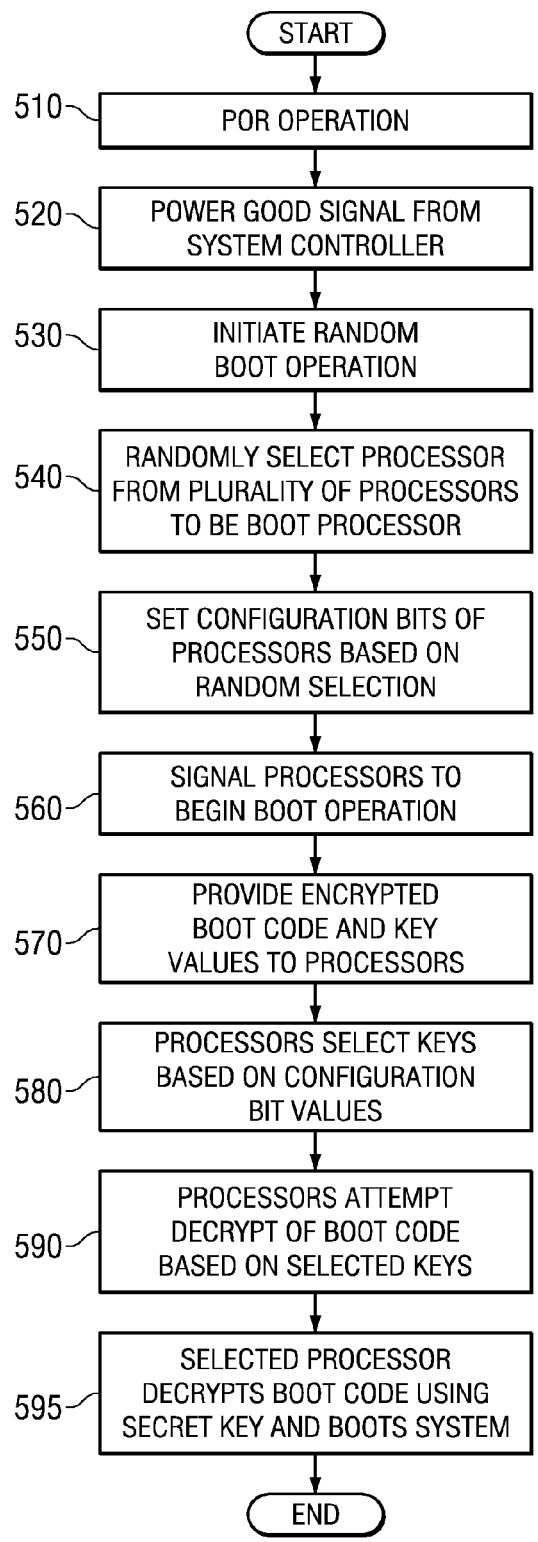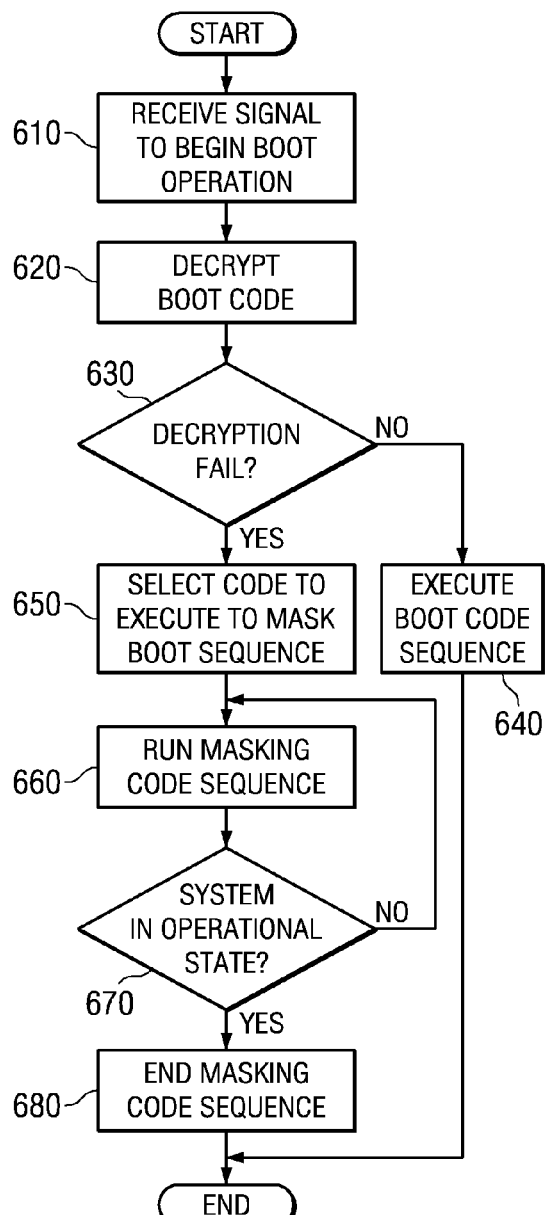

SECURE BOOT ACROSS A PLURALITY OF PROCESSORS

This application is a continuation of application Ser. No. 11/423,342, filed Jun. 9, 2006, now abandoned.

BACKGROUND

1. Technical Field

The present application relates generally to an improved data processing system and method. More specifically, the present application is directed to a system and method for secure boot across a plurality of processors.

2. Description of Related Art

As our society becomes increasingly dependent upon electronic communication and storage of information, concerns over the security of digital information, such as personal information and digital rights management (DRM), have increased. Moreover, the sophistication of computer hackers and other unauthorized interlopers into computing systems has increased in recent years. As a result, much effort has gone into the development of security systems for computing devices so that such sensitive digital information may be secured from unauthorized access.

One way in which an intruder may gain access to a computing system is to observe the boot activity of a computing system through electrical interfaces and other observable electromagnetic or thermal activity. By observing the boot activity in this way, the intruder may deduce what data signals are being input and output by the boot processor, what cryptographic algorithms are running on the processors, and the like. From this information, an intruder may detect points in the boot sequence where unauthorized intrusion may be made. Moreover, with secure boot sequences in which security keys are required for booting of the system, the intruder may reverse the cryptographic algorithm used by the boot processor to obtain access to the security keys and thereby be given complete access to the computing system. Since the overall security of the computing system is often dependent upon the security of the boot process, when the intruder gains access to the boot sequence, the security of the entire system may be at risk.

Thus, it would be beneficial to have an apparatus and method that increases the difficulty of monitoring the boot sequence of a processor so as to make the system more secure from unauthorized intrusion.

SUMMARY

The illustrative embodiments provide a system and method for selecting a random processor to boot a multiprocessor system and for providing a secure boot across a plurality of processors. By randomizing which processor will be used to boot the multiprocessor system, the ability of unauthorized persons to monitor the electrical interfaces, thermal activity, and other electromagnetic activity to obtain information about the boot sequence for purposes of defeating the security of the system is made more difficult. For example, in a multiprocessor system, the would-be intruder would either need to run the boot sequence many different times while monitoring a single processor in hopes that it may be randomly selected as the boot processor, or monitor all of the processors at boot in order to determine which one was the actual boot processor. Both options require considerable effort on the part of the would-be intruder that may act as a deterrent from actually attempting to monitor the system to obtain boot sequence information or at least add significant delay to the time it would take the would-be intruder to compromise the system.

With the mechanisms of the illustrative embodiments, pervasive logic is provided on a multiprocessor system, such as a system-on-a-chip, that controls the boot operation of the multiprocessor system. The pervasive logic includes a random event generator which randomly selects which processor in the multiprocessor system is to be the boot processor that runs the boot code to thereby bring the system into an operational state. Based on the random selection of a boot processor, a configuration bit associated with the boot processor is set indicating that processor to be the boot processor. Thereafter, the selected boot processor is provided with the necessary security key(s) for secure booting of the multiprocessor system into an operational state.

In some illustrative embodiments, while the randomly selected processor performs the secure boot operation, the other processors of the multiprocessor system perform operations to mask the real secure boot operation. This masking may involve executing other code sequences, other than the boot code sequence, that cause the processors to generate electromagnetic and/or thermal outputs that, if monitored by an interloper, would make it difficult for the interloper to distinguish which processor is performing the actual secure boot operation.

One way in which a different code sequence may be generated is by inserting random delay elements into the boot code that run loops which iterate a random amount. In this way, each processor may run the boot code but with differing delay amounts thereby causing different electromagnetic and thermal signatures to be generated. From an interloper's perspective, it will be very difficult to discern the actual boot processor from the other processors in the multiprocessor system due to such masking.

In a further illustrative embodiment, the code sequences performed by the other processors are the same boot code sequence that the randomly selected processor executes but with dummy security keys. Thus, these other processors operate and look, to an interloper, as if they are performing the secure boot operation. However, if the processors are monitored, false electromagnetic and thermal outputs are identified that make it difficult for the interloper to determine if the monitored processor is the actual randomly selected processor that is performing the secure boot operation.

In a still further illustrative embodiment, masking of the randomly selected boot processor may be performed by providing a dummy processor. The dummy processor appears, from an electromagnetic, thermal, etc., monitoring apparatus perspective, as if it is unique by running processes different from the boot code sequence on this dummy processor to thereby redirect attacks on the system to this dummy processor. In this way, when an interloper attempts to access the system by getting around the security mechanisms, the interloper only accesses a dummy processor that does not have actual access to the rest of the multiprocessor system.

In other illustrative embodiments, the boot code sequence may be distributed across a plurality of processors in the multiprocessor system. By distributing the boot code sequence across a plurality of processors in the multiprocessor system, the number of processors that must be compromised in order to obtain complete information about the boot sequence and thereby circumvent security measures is increased. Thus, the distributed boot operation of the illustrative embodiments is more secure than multiprocessor data processing systems that utilize a single secure core. Furthermore, by distributing the boot operation, if any portion of the boot operation is compromised, the boot operation fails, thereby preventing an unauthorized individual from circumventing the security of the system.

With this illustrative embodiment, the boot code sequence is partitioned into a plurality of partitions such that each partition may be provided to a different processor of the multiprocessor system. As each partition of the boot code sequence is executed, that partition must complete correctly on its respective processor before the boot code sequence may proceed on another processor. A secure communication mechanism is used to communicate satisfactory completion of a previous partition of the boot code sequence. This secure communication mechanism may include a security token, such as an encrypted password or other security identifier, e.g., a public/private encryption key pair, that indicates that the previous session was not compromised. In this way, a chain of dependent "sessions" are created that must complete satisfactorily.

The processors that are involved in the distributed execution of the boot code may be all of the processors in the multiprocessor system or a sub-set of the processors in the multiprocessor system. For example, a random selection mechanism, such as that described above for selecting a single boot processor, may be used to randomly select a plurality of boot processors to be used in booting the system in a distributed manner. Moreover, the particular partitions of the boot code that are executed by the processors may be randomly selected such that, with each power-on reset (POR) operation, the same processor may or may not execute the same boot code partition as in a previous POR operation. Thus, randomization may be performed with regard to which processors are involved in the distributed boot operation as well as with regard to what boot code partitions each processor will execute.

Other processors of the multiprocessor system, i.e. non-boot processors, may either not perform any work during the distributed boot operation or may execute masking code sequences, of one or more of the various masking code illustrative embodiments described previously, to mask the boot code execution on the randomly selected sub-set of processors. In other words, the distributed boot code sequence operation of the present illustrative embodiment may be combined with one or more of the previously described illustrative embodiments.

In one illustrative embodiment, a method is provided, in a data processing system having a plurality of processors, for booting the data processing system. The method may comprise partitioning boot code into a plurality of boot code partitions and loading, in each of a plurality of boot processors within the plurality of processors of the data processing system, a boot code partition from the plurality of boot code partitions. The plurality of boot code partitions may be executed on their respective associated boot processors as a plurality of sessions to thereby boot the data processing system. The number of boot code partitions may be equal to a number of boot processors.

If any session results in an unsuccessful or compromised execution of a boot code partition, booting of the data processing system may fail. As execution of each boot code partition in its associated session is completed, an associated boot processor of the plurality of processors that executed the boot code partition may signal, to another boot processor associated with a next boot code partition in a boot code sequence, the successful completion of the boot code partition.

Executing the plurality of boot code partitions on their respective associated boot processors may comprise utilizing a security mechanism on communications between boot processors to ensure uncompromised execution of the plurality of boot code partitions on their respective associated boot processors. The security mechanism may comprise at least one of passing a security token between boot processors, passing a digital signature between boot processors, using a password, passing a checksum of a boot code partition, or using public key/private key encryption of the signals.

The method may further comprise randomly selecting the boot processors from the plurality of processors, wherein the boot processors are a sub-set of the plurality of processors. Masking code may be executed on processors of the plurality of processors that were not randomly selected to be boot processors.

Moreover, the method may comprise randomly selecting which boot code partition is associated with each boot processor. Each boot code partition may be different from other boot code partitions.

Furthermore, the sessions for execution of boot code partitions on the boot processors may be arranged in one of a daisy-chain arrangement, a ring arrangement, or a master/slave arrangement. The data processing system may be a heterogeneous multiprocessor system-on-a-chip having a first processor the operates according to a first instruction set and one or more second processors that operate according to a second instruction set different from the first instruction set.

In another illustrative embodiment, a data processing system is provided that comprises a plurality of processors, a boot code storage coupled to the plurality of processors, and pervasive logic coupled to the plurality of processors. The boot code storage may store boot code that is partitioned into a plurality of boot code partitions. The pervasive logic may perform various ones, and combinations of, the operations outlined above with regard to the illustrative method embodiment described previously.

In yet another illustrative embodiment, a computer program product comprising a computer useable medium having a computer readable program is provided. The computer readable program, when executed on a data processing system, may cause the data processing system to perform various ones, and combinations of, the operations outlined above with regard to the illustrative method embodiment described previously.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary diagram illustrating the primary operational components of a random boot processor selection mechanism in accordance with one illustrative embodiment;

FIG. 3A is an exemplary diagram illustrating a random selection mechanism in accordance with one illustrative embodiment;

FIGS. 4A-4D are exemplary diagrams illustrating masking operations for masking a secure boot operation of a randomly selected boot processor in accordance with illustrative embodiments;

FIG. 5 is a flowchart outlining an exemplary operation for randomly selecting a processor in a multiprocessor system as a boot processor;

FIG. 6 is a flowchart outlining an exemplary operation for masking a boot code sequence in accordance with one illustrative embodiment;

DETAILED DESCRIPTION OF THE PREFERRED EMBODIMENTS

The illustrative embodiments provide an apparatus and method for selecting a random processor to boot on a multiprocessor system. The illustrative embodiments may be implemented for use with any multiprocessor system in which one of the processors may be selected for booting the multiprocessor system. Thus, the mechanisms of the illustrative embodiments are applicable to symmetric multiprocessor (SMP) systems, heterogeneous multiprocessor systems, non-coherent asymmetrical multiprocessor systems, and the like.

One multiprocessor system in which the illustrative embodiments may be implemented is the Cell Broadband Engine (CBE) available from International Business Machines, Inc. of Armonk, N.Y. The illustrative embodiments will be described with reference to the CBE architecture, however, it should be appreciated that the description of the illustrative embodiments is only exemplary and is not intended to state or imply any limitation with regard to the types or configurations of the multiprocessor systems in which the mechanisms of the illustrative embodiments may be implemented. Many modifications to the described CBE architecture may be made without departing from the spirit and scope of the present invention.

Figure 1:
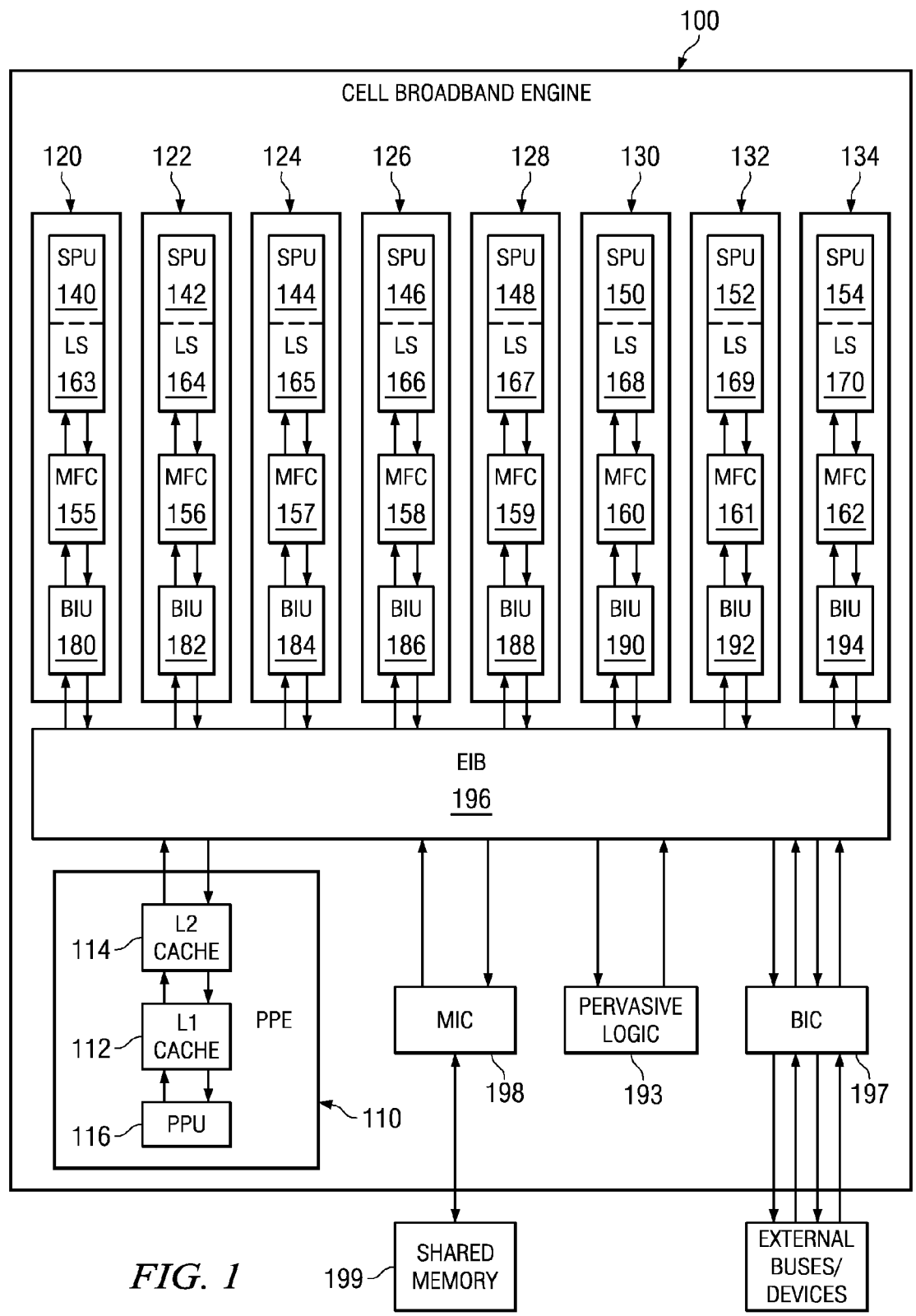
FIG. 1 is an exemplary block diagram of a multiprocessor system in which the illustrative embodiments may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a power processor unit (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPUs execute Single Instruction Multiple Data (SIMD) instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices, such as a SouthBridge™ communications processor, for example.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and bus interface units 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCS) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The illustrative embodiments provide an apparatus and method for selecting a random processor, such as one of the SPEs 120-134, to boot a multiprocessor system, e.g., the CBE 100. By randomizing which SPE 120-134 will be used to boot the CBE 100, the ability of unauthorized persons to monitor the electrical interfaces, thermal activity, and other electromagnetic activity to obtain information about the boot sequence for purposes of defeating the security of the CBE 100 is made more difficult.

With the mechanisms of the illustrative embodiments, pervasive logic 193 is provided on the CBE 100 which controls the boot operation of the CBE 100. The pervasive logic 193 includes a random event generator which randomly selects which SPE 120-134 is to be the boot processor that runs the boot code to thereby bring the system into an operational state. Based on the random selection of a boot SPE 120-134, a configuration bit associated with the selected SPE, e.g., SPE 120, is set indicating that SPE 120 to be the actual boot processor. Thereafter, the selected SPE 120 is provided with the necessary security key(s) for secure booting of the CBE 100 into an operational state. When the chosen SPE successfully completes the secure boot procedure, it will transition from a secure state, wherein the MIC 198, Shared Memory 199, and a portion of the BIC 197 other than the communication link to Flash Rom 230 in FIG. 2 hereafter, are shutdown and prevented from operation, to an unlocked state. Once the secure SPE enters the unlocked state, it will initiate the process of fully enabling the MIC 198, BIC 197 (a process referred to as "training"), and all other processors (SPEs and PPE) by executing the encrypted code provided by the Flash ROM 230. For more information regarding the secure boot process used in the Cell Broadband Engine, reference is made to co-pending and commonly assigned U.S. Patent Application Publication No. 20050021944, which is hereby incorporated by reference.

In some illustrative embodiments, while the randomly selected SPE 120 performs the secure boot operation, the other SPEs 122-134 perform operations to mask the real secure boot operation. This masking may involve executing other code sequences, other than the boot code sequence, that cause the SPEs 122-134 to generate electrical, electromagnetic, and/or thermal outputs that, if monitored by an interloper, would make it difficult for the interloper to distinguish which SPE 120-134 is performing the actual secure boot operation.

One way in which a different code sequence may be generated is by inserting random delay elements into the boot code that run loops which iterate a random amount. These random delay elements are added so that while booting the processor, the secure-boot algorithm will change in a random way to cause different electromagnetic and thermal signatures, thereby making it difficult to compare two different boot operations over time. In this way, each SPE 120-134 may run the boot code but with differing delay amounts thereby causing different electromagnetic and thermal signatures to be generated. Moreover, the same SPE 120-134 will generate different electromagnetic and thermal signatures each time it runs the secure boot code. From an interloper's perspective, it will be very difficult to discern the actual boot SPE 120 from the other SPEs 122-134 in the CBE 100 due to such masking.

In a further illustrative embodiment, the code sequences performed by the other SPEs 122-134 are the same boot code sequence that the randomly selected SPE 120 executes but with dummy security keys. Thus, these other SPEs 122-134 operate and look, to an interloper, as if they are performing the secure boot operation. However, if the SPEs 122-134 are monitored, false electrical, electromagnetic, and thermal outputs are identified that make it difficult for the interloper to determine if the monitored SPE is the actual randomly selected SPE 120 that is performing the secure boot operation.

In a still further illustrative embodiment, masking of the randomly selected boot SPE 120 may be performed by providing a dummy SPE (not shown). The dummy SPE appears, from an electromagnetic, thermal, etc., monitoring apparatus perspective, as if it is unique by running processes different from the boot code sequence on this dummy SPE to thereby redirect attacks on the CBE 100 to this dummy SPE. In this way, when an interloper attempts to access the system by getting around the security mechanisms, the interloper only accesses a dummy SPE that does not have actual access to the rest of the CBE 100. Furthermore, if the intruder compromises the dummy SPE and attempts to execute code, the dummy SPE can then shutdown the rest of the CBE 100 to prevent further intrusion attempts.

Each of the above mentioned illustrative embodiments will now be described in greater detail. It should be appreciated that, while each illustrative embodiment will be described separately herein, the illustrative embodiments may be combined in various ways so as to achieve even greater security of the multiprocessor system, e.g., CBE 100. Thus, any combination of the illustrative embodiments that is deemed suitable to a particular situation and multiprocessor environment is intended to be within the spirit and scope of the present invention.

FIG. 2 is an exemplary diagram illustrating the primary operational components of a random boot processor selection mechanism in accordance with one illustrative embodiment. It should be appreciated that, for simplicity of the explanation of the illustrative embodiments, FIG. 2 only shows one processor of a multiprocessor system in detail. However, it should be appreciated that each of the processors of the multiprocessor system have a similar arrangement of elements and operate in a similar manner to that of the processor that is explicitly shown in FIG. 2. Any number of processors may be included in the multiprocessor system without departing from the spirit and scope of the present invention. However, for purposes of explanation of the illustrative embodiments, it will be assumed that the number of processors is eight as in the CBE architecture shown in FIG. 1.

As shown in FIG. 2, the primary operational components of a random boot processor selection mechanism include a system controller 210, a secure key storage 220, a flash ROM 230, and pervasive logic 240. In one illustrative embodiment, taking the CBE architecture of FIG. 1 as exemplary, elements 210-240 may be elements that are provided on the chip in which the CBE architecture is implemented. That is, these elements 210-240 may be built into the logic of a multiprocessor system-on-a-chip (SoC) and thus, the operations performed by these elements 210-240 may be performed on-chip. Alternatively, one or more of the elements may be provided off chip, e.g., the flash ROM 230 may be provided off-chip.

The system controller 210 is responsible for performing the initial operations of a power on reset (POR) to bring the power of the system to an acceptable and stable level. That is, the system controller 210 is responsible for bringing up the voltages, turning on the system clock, and other initial operations required for bringing the multiprocessor system to a state where boot operations may begin, as is generally known in the art. As part of this POR operation, the processors 280-290 are brought up in a secure mode of operation. In this secure mode of operation, the processor's local stores are not accessible outside the processor. The system controller 210, once these initial operations are completed and the system is at an acceptable power state, signals a "power good" state to the pervasive logic 240.

In response to the "power good" signal from the system controller 210, the pervasive logic 240 begins a boot operation for booting the multiprocessor system into an operational state such that software programs may begin to execute. As part of this boot operation, a random event generator 242 of the pervasive logic 240 randomly selects one of the processors, e.g., processor 280, to be the boot processor for the multiprocessor system. The random event generator 242 generates a signal that is sent to each of the processors of the multiprocessor system. The signal is logically high only for the processor that is selected as the boot processor. This signal effectively sets the value in the configuration bit register 250 of the randomly selected processor 280 to a value, e.g., "1", indicative of this processor 280 being the boot processor. The other processors will have their configuration bit values in their respective configuration bit registers kept at an initial value, thereby indicating that these processors are not the randomly selected boot processor for the multiprocessor system.

The boot code for booting the multiprocessor system is stored in an encrypted format in flash ROM 230. The encrypted boot code 232 may be provided to each of the processors 280-290. That is, as part of the boot sequence, each of the processors 280-290 may attempt to read the encrypted boot code 232 from the flash ROM 230. However, since only one of the processors has been randomly selected as the boot processor, only one of the processors will be able to decrypt the encrypted boot code 232 and properly execute it so as to bring the multiprocessor system to an operational state. This is achieved through the use of a selector 260 provided in each of the processors that selects between the secret key that is the key value used to decrypt the encrypted boot code 232 and a randomly generated key value that will not be able to decrypt the encrypted boot code 232.

The value stored in the configuration bit register 250 is used to generate a selector signal that is provided to the selector 260. For example, selector 260 may be a multiplexer that receives the secure key (Skey) from the secure key storage 220 as one input, a randomly generated key value from a random value generator 262 as a second input, and the select signal from the configuration bit register 250 indicating which of the two inputs to select. If the configuration bit register 250 stores a value indicative of the processor being the randomly selected boot processor, then the Skey input is selected. If the configuration bit register 250 stores a value indicative that the processor is not the randomly selected boot processor, then the randomly generated key value input may be selected by the selector 260. The selected key value is then output to the SPE 270.

The SPE 270 receives the selected key value and the encrypted boot code 232. The SPE 270 then attempts to decrypt the encrypted boot code 232. If the selected key value is the Skey from the secure key storage 220, then the SPE 270 will be able to properly decrypt the encrypted boot code 232 and execute the boot code instructions therein to bring the system to an operational state. If the selected key value is not the Skey from the secure key storage 220, then the decryption will fail and the SPE 270 will not be able to execute the boot code instructions.

The above process for randomly selecting a boot processor and booting the multiprocessor system using the randomly selected boot processor may be performed with each power-on reset (POR) operation performed by the multiprocessor system. Thus, each time the multiprocessor system is booted, a different one of the plurality of processors may be randomly selected to be the boot processor. As a result, a potential intruder into the system will not be able to determine, a priori, which processor is the boot processor and direct measurements of electromagnetic and thermal conditions of the multiprocessor system to that particular processor.

On the contrary, the potential intruder must either monitor a single processor through multiple boot-up operations of the multiprocessor system in hopes that the single processor will eventually be selected as the random processor to be the boot processor or the potential intruder must monitor all of the processors to thereby identify which processor is the boot processor and attempt to obtain the necessary information through measurements of its individual electromagnetic and thermal conditions. In an eight processor system, for example, the difficulty in monitoring the boot sequence is made eight times more difficult since all eight processors must be monitored. Moreover, more probes and hardware would be need to do such monitoring, thereby adding to the difficulty of attempting such monitoring.

FIG. 3A is an exemplary diagram illustrating a random selection mechanism in accordance with one illustrative embodiment. As described above, the principle idea behind the illustrative embodiments is the random selection of a processor, from a plurality of processors, to be the boot processor for the multiprocessor system. In order to do this random selection, a random event generator and selector mechanism are provided. The random event generator is provided in pervasive logic of the multiprocessor system while a selector is provided in association with each of the processors, in the illustrative embodiments. FIG. 3A provides a depiction of one implementation of a random event generator and selector in accordance with one illustrative embodiment.

As shown in FIG. 3A, the random event generator 310, which may correspond to the random event generator 242 in FIG. 2, for example, includes a linear feedback shift register (LFSR) counter 320, a ring oscillator 330, and a selector signal register/decoder 340. The ring oscillator 330 is a device composed of an odd number of NOT gates whose output oscillates between two voltage levels. The NOT gates, or inverters, are attached in a chain with the output of the last inverter being fed back into the first inverter. The last output of a chain of an odd number of inverters is the logical NOT of the first input. This final output is asserted a finite amount of time after the first input is asserted. The feedback of this last output to the input causes an unstable oscillation that will vary in time according to random elements such as electromagnetic noise on the power supply and temperature.

The output of the ring oscillator 330 is provided as an input to the LFSR counter 320 along with a clock signal clk. The LFSR counter 320 is a shift register whose input bit is a linear function of its previous state. The only linear functions of single bits are XOR and inverse-XOR and thus, the LFSR is a shift register whose input bit is driven by the exclusive-or (XOR) of some bits of the overall shift register value.

The initial value of the LFSR counter 320 is called the seed, and because the operation of the register is deterministic, the sequence of values produced by the LFSR counter 320 is completely determined by its current (or previous) state. A LFSR counter 320 with a well-chosen feedback function can produce a sequence of bits which appears random and which has a very long cycle. In the illustrative embodiments, this randomness is made more apparent in that the input to the LFSR counter 320 is a product of the oscillation produced by the ring oscillator 330 and the discrepancy between the frequency of the ring oscillator 330 and the input clock clk which vary independently of one another.

Figure 3B:
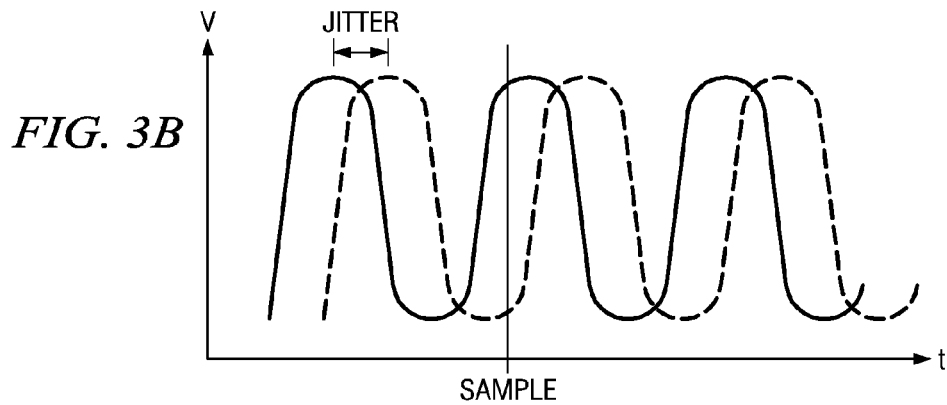
FIG. 3B is a graphical representation of jitter introduced into the input to a LFSR counter of a random event generator in accordance with one illustrative embodiment.

The LFSR counter 320 receives, as input, the output from the ring oscillator 330 and the clock signal clk, and generates an output bit stream that is stored in selector signal register/ decoder 340. The inverters of the ring oscillator 330 introduce a delay in the output signal to the LFSR counter 320 and thus, there is a discrepancy between the frequency of the ring oscillator 330 and the input clock clk. This discrepancy between the frequencies gives rise to jitter in the input to the LFSR counter 320, as depicted in FIG. 3B. This jitter provides a measure of randomness which randomizes the output generated by the LFSR counter 320.

The output of the LFSR counter 320 is stored in the selector signal register/decoder 340. In the depicted example, the LFSR counter 320 is a 3-bit counter which generates a 3-bit output that is interpreted to encode a value 1-8. A decoder function of the selector signal register/decoder 340 selects one of the 8 unique outputs based on the random 3-bit input value. Based on the state of the bits stored in the selector signal register 340, high or low state signals are output to the configuration bit registers of the various processors, e.g., SPE0-SPE7 120-134 in FIG. 1, to thereby set the values stored in the configuration bit registers and thus, select one of the processors to be the boot processor for the multiprocessor system.

Once the configuration bit register values are set, these values are used to provide selector signals to the corresponding selectors 350-370. As shown in FIG. 3A, the selector signal is provided to a multiplexer 352, 362, 372, along with an Skey input and a random key value input. Based on the state of the selector signal, either the Skey input or the random key value input is selected by each of the multiplexers 352, 362, 372. The random key value inputs may be generated by one or more random value generators of the same or a different type from the random event generator configuration described above for selecting the boot processor. That is, a similar random event generator configuration as described above may be used to randomly generate a key value having a same length as the Skey. These random key values are then input to the multiplexers 352, 362, and 372.

The system is designed such that, by way of the decoder function describe above, for example, only one of the selector signals that are input to the multiplexers 352, 362, 372 will select the Skey input while all the others will select a random key value input. The outputs from the multiplexers 352, 362, and 372 are provide to the corresponding SPEs so that the SPEs may utilize these outputs for either decrypting boot code and executing the boot code, in the case of the randomly selected boot processor, or attempting to decrypt the boot code and failing to boot the multiprocessor system, as in the case of all other processors in the multiprocessor system.

It should be appreciated that the mechanisms described above for providing a random event generator and selector are only exemplary and are not intended to state or imply any limitation with regard to the types of random event generators and selectors that may be used with the illustrative embodiments. For example, rather than using a ring oscillator and LFSR counter arrangement as shown in FIG. 3A, other random event generators may be utilized. For example, a thermal sensor may be used to measure thermal noise which may then be used to generate a random event for selecting one of the processors as a boot processor. Similarly, a quantum dot (q-dot), or semiconductor nanocrystals, may be used to measure quantum source effects that may be used as a source of randomness for selecting a processor as the boot processor. Any strong source of randomness may be used with the illustrative embodiments to provide a random selection of a processor for use as the boot processor for the multiprocessor system.

Moreover, it should be appreciated that while FIG. 3A shows the ring oscillator 330 having five inverters, the illustrative embodiments are not limited to such. Rather, any number of inverters, so long as there are an odd number of inverters, may be used without departing from the spirit and scope of the present invention. In fact, in order to provide additional jitter in the input to the LFSR counter 320, it may be desirable to add additional inverters to the chain of inverters in the ring oscillator 330 so as to introduce even more discrepancy between the frequency of the input clock signal clk and the input from the ring oscillator 330. The amount of discrepancy may be selected based on the desired operational characteristics for the particular multiprocessor system in which the illustrative embodiments are implemented.

Furthermore, while FIGS. 2 and 3A depict the random key value being generated by a separate random key value generator for each processor, the illustrative embodiments are not limited to such. Rather, a single random key value generator may be provided for all of the processors with the random key value generator generating one or more random key values that are input to the processors. Thus, for example, the random key value generator may generate a single random key value that is provided to all of the processors, a separate random key value for each individual processor (in which case seven different random key values may be generated, for example), or any number of random key values that may be selectively provided to the various processors of the multiprocessor system.

Figure 3C:
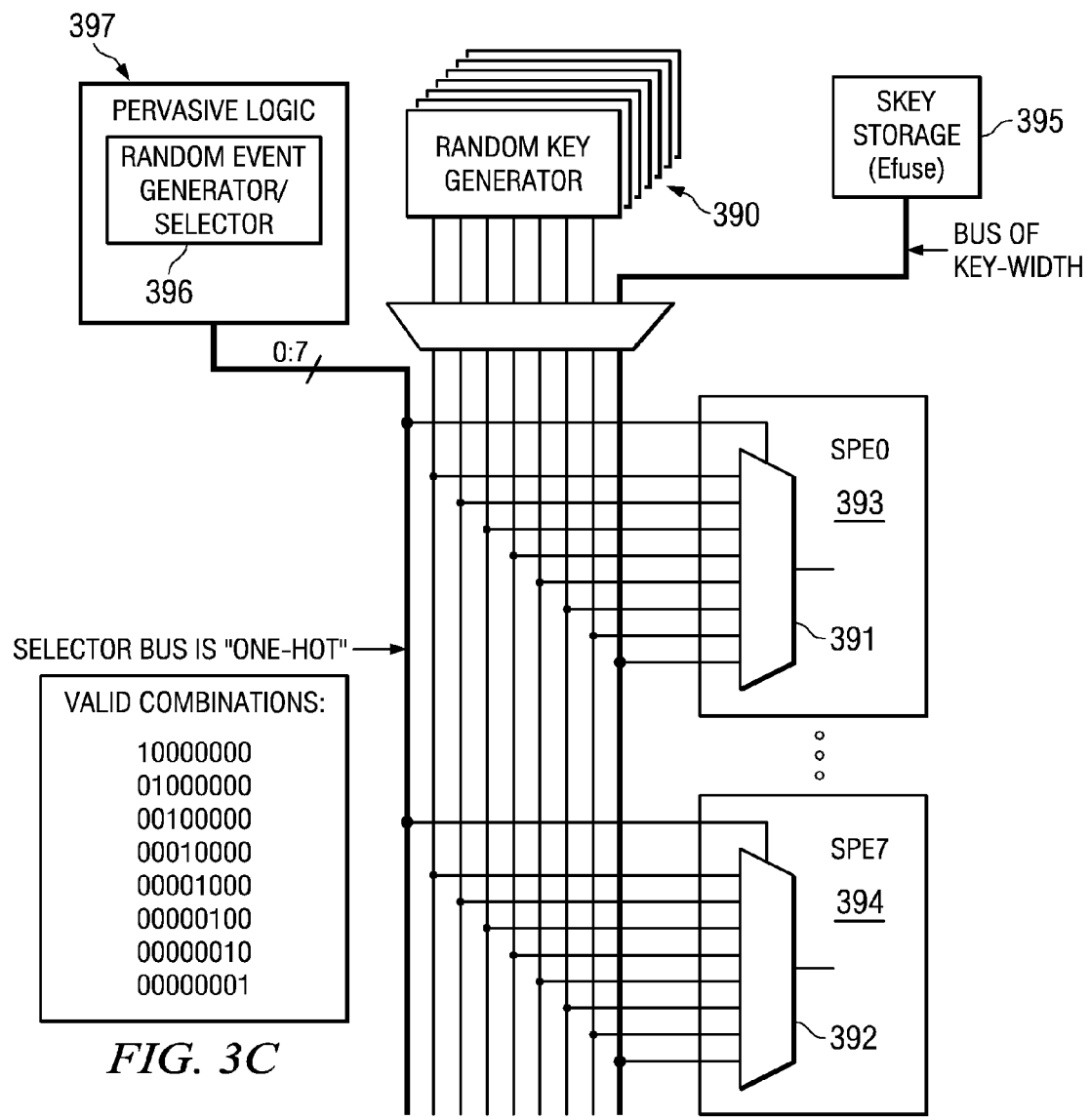
FIG. 3C is an exemplary diagram illustrating an illustrative embodiment in which a secret key and a plurality of randomly generated key values are provided to processors using parallel signal lines.

In one illustrative embodiment, as illustrated in FIG. 3C, a plurality of random key value generators 390 may be provided that each output a different random key value. Alternatively, as mentioned above, a single random key value generator may be used in replacement of these separate random key value generators. These random key values may be provided as inputs to the selectors, e.g., multiplexers 391 and 392, of the processors, e.g., SPEs 393 and 394, in the multiprocessor system along with the secure key (Skey) from an Skey storage 395, e.g., an eFuse, that is actually used to decrypt the boot code for booting of the multiprocessor system. As shown, the randomly generated key values and the Skey value may be multiplexed and provided on eight identical signal lines to each of the multiplexers 391 and 392 so as to make it more difficult for an intruder to isolate one of the lines as being a signal line from the secure key storage 395.

The eight total key value inputs may be provided to the multiplexers 391 and 392 and the select signals from the random event generator 396 in the pervasive logic 397 may be used to select one of the eight inputs. In this case, rather than simply selecting between the Skey input and a random key value, the multiplexers 391 and 392 may select between the Skey input and seven random key values. Thus, a first processor may select the Skey input, based on the random selection of this first processor as the boot processor, a second processor may select a third random key value, a third processor may select a fourth random key value, a fifth processor may select a first random key value, and so on. Thus, each processor may receive a different key value, either the Skey or a randomly generated key value. As a result, it becomes difficult for an intruder to discern which key value is the correct key value when monitoring bus traffic of the multiprocessor system.

It should be further appreciated that the mechanisms shown in FIGS. 3A and 3C are preferably provided in lower layer metal layers of the ceramic package in which the multiprocessor system is provided, or the lowest layer of interconnect, if the design is on a single chip. Since the ability to probe electrical and thermal characteristics of a multiprocessor system is currently limited to the upper layers of the multiprocessor ceramic package, by placing these elements in the lower layer metal layers, the ability to probe the operation of these elements is made more difficult. Thus, it is very difficult, if not impossible, for a would-be intruder to monitor the thermal and electrical characteristics of the random event generator and selectors so as to determine the key values provided by these elements.

Using the mechanisms above, a processor within a plurality of processors of a multiprocessor system may be randomly selected to boot the multiprocessor system. In this way, the ability to monitor the electrical and thermal characteristics of the processors so as to obtain secret information, e.g., the secret keys, used to boot the multiprocessor system is made more difficult and potentially becomes a deterrent to those who may wish to access the multiprocessor system without authorization.

While the above mechanism for randomly selecting a processor to boot the multiprocessor system provide a good amount of protection against monitoring of the boot sequence, it may still be possible for an unauthorized individual to "hack" the system if such an individual is persistent enough. In order to make such monitoring virtually impossible, the illustrative embodiments provide additional mechanisms for masking the boot sequence on the randomly selected processor such that the unauthorized individual is not able to discern which processor is correctly performing the actual boot sequence for booting the multiprocessor system.

In one illustrative embodiment, the masking operation involves each of the processors that were not selected to be the boot processor running a different set of instructions to thereby generate masking electrical and thermal signatures that make it difficult to discern the boot processor from the other processors in the system. The code sequences that are run by the different processors may be the same default code sequence that is provided either in a memory associated with the processor, or is otherwise accessible by the processors when the processors are not able to decrypt the boot code sequence. For example, the default code sequence may be provided in a secure portion of a local store associated with each of the processors. Alternatively, the default code sequence may be provided in a flash ROM or other storage device provided on or off-chip.

When the processor is not able to decrypt the actual encrypted boot code received from the flash ROM, the processor may default back to this secure portion of local storage which causes the processor to execute instructions to mask the boot code sequence being performed on another processor. This sequence of instructions may not generate any useable information and may serve only a masking function. Alternatively, this sequence of instructions may be used to perform operations for monitoring the system during the boot operation, or other useful operations, for example.

In one illustrative embodiment, the code that is executed on each of the non-selected processors, i.e. the non-boot processors, is the same. In illustrative embodiments where the code that is executed by each of the non-selected processors is the same, the code that is run on each of these non-selected processors preferably is code that generates electrical and thermal profiles that resemble the actual boot code but do not provide any of the secret information that an intruder would require in order to circumvent the security of the multiprocessor system. Such code may perform similar operations to that of the actual boot code but not access the sensitive portions of the multiprocessor system. In fact, in one illustrative embodiment, the same boot code that is used to boot the multiprocessor system may be used by the non-selected processors but with access to the secure key (Skey) and other privileged information being made inaccessible.

As a result, the thermal profile and bus traffic of these non-selected processors will approximate the actual boot sequence. Thus, from the perspective of an intruder using monitoring probes to monitor the thermal profile, bus traffic, and the like, the intruder will be unable to decipher which core is performing the actual boot operation since all of the cores will look the same via the monitoring probes. Such ambiguity deters tampering and makes it more difficult to isolate the real boot code sequence, secret key information, and the like.

In other illustrative embodiments, each of the non-selected processors may execute a different set of instructions. By executing different sets of instructions on each of the non-selected processors, none of the processors look unique when monitored using electrical or thermal probes. As a result, a distinguishing characteristic, such as thermal profile or bus traffic, cannot be identified by probes so as to identify which processor is the boot processor.

These different sets of instructions may be randomly selected for each of the processors in the multiprocessor system. Thus, for example, differing start addresses for code sequences stored in an on-chip storage device, e.g., a flash ROM or the like, may be randomly selected and provided to the processors of the multiprocessor system. The processors may then begin executing instructions at the randomly selected start addresses thereby generating different thermal profiles and bus traffic that masks the actual boot code sequence.

One way in which to provide different code sequences for the different processors is to provide boot code that has random delay elements inserted into the boot code. These delay elements may be, for example, loops that iterate a random number of times. Such delay elements may be provided both in the actual boot code sequence run by the randomly selected boot processor and in the boot code sequences run by the non-selected processors. This random delay causes the boot code to "look" different on each of the processors from the perspective of an intruder monitoring the thermal and bus traffic characteristics of the processors. As a result, it is not possible for the intruder to discern which processor is running the actual boot code that boots the multiprocessor system.

In yet another illustrative embodiment, a dummy processor is provided that looks as though it is unique when monitored by an intruder. This illustrative embodiment is a combination of the previous embodiments in which one processor is randomly selected to be the boot processor, one processor of the non-selected processors is selected to be a dummy processor that runs code that provides a unique thermal and bus traffic profile from the boot code sequence, and the other processors run code sequences that replicate the thermal profile and bus traffic of the actual boot code sequence as close as possible. In this way, the intruder will detect the dummy processor as being unique from the other processors and will conclude that this processor is running the actual boot code sequence. Thus, the intruder will direct its attacks to this dummy processor rather than the actual boot processor that appears to be similar to the other processors from a thermal profile and bus traffic standpoint. Furthermore, if the intruder attempts to run code or otherwise actively interfere with the dummy processor, the dummy processor can then signal a system shutdown.

Figure 4A:
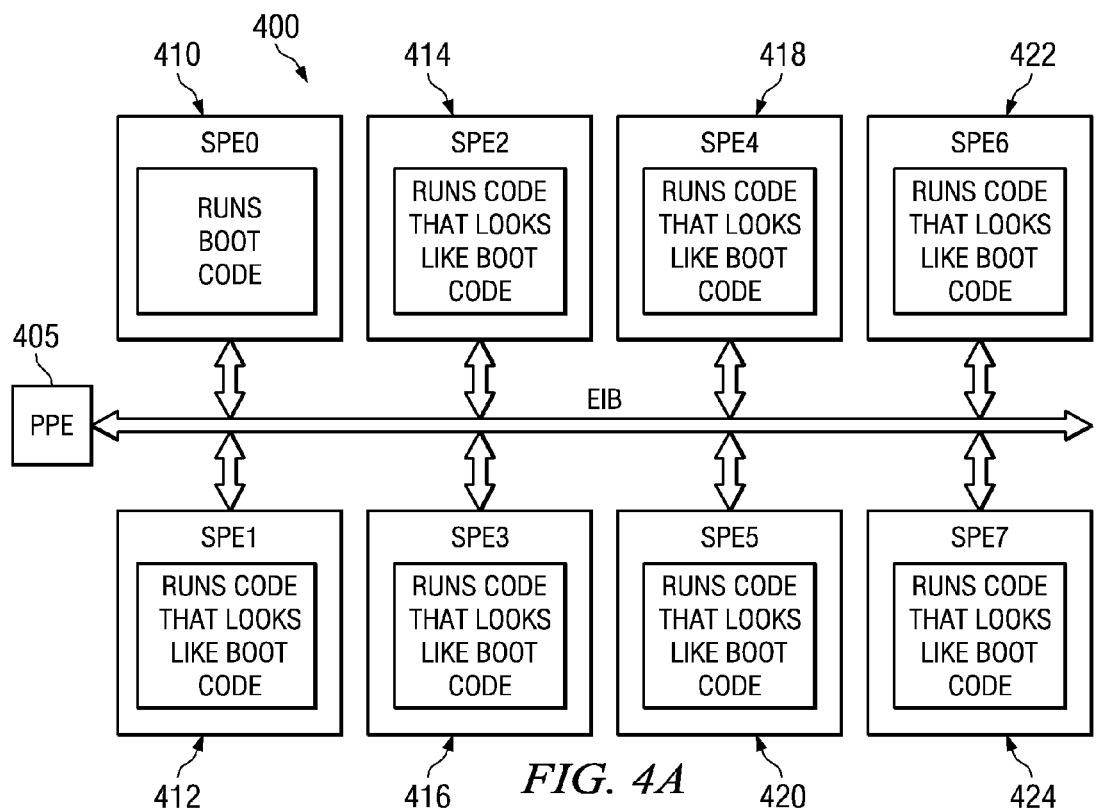

FIGS. 4A-4D are exemplary diagrams illustrating masking operations for masking a secure boot operation of a randomly selected boot processor in accordance with illustrative embodiments. FIG. 4A illustrates a first masking operation in which code that appears, from a monitoring probe standpoint, to be the same as the boot code sequence is run on each of the non-selected processors. As shown in FIG. 4A, SPE0 410 is randomly selected, such as by use of the mechanisms described previously, to be the boot processor for the multiprocessor system 400. Thus, SPE0 410 receives the secret key, decrypts the boot code sequence from the flash ROM, and executes the actual boot code operations required to bring the multiprocessor system 400 into an operational state. The other SPEs, i.e. SPE1-SPE7 412-424, execute code that looks like the boot code sequence from the perspective of a monitoring probe.

As described above, the code sequence that the other SPEs 412-424 run may be default code sequences provided in a secure portion of local storage which causes the SPE 412-424 to execute instructions to mask the boot code sequence being performed on SPE0 410. The code that is run on each of these non-selected SPEs 412-424 preferably is code that generates electrical and thermal profiles that resemble the actual boot code but do not provide any of the secret information that an intruder would require in order to circumvent the security of the multiprocessor system. Such code may perform similar operations to that of the actual boot code but not access the sensitive portions of the multiprocessor system 400.

Figure 4B:
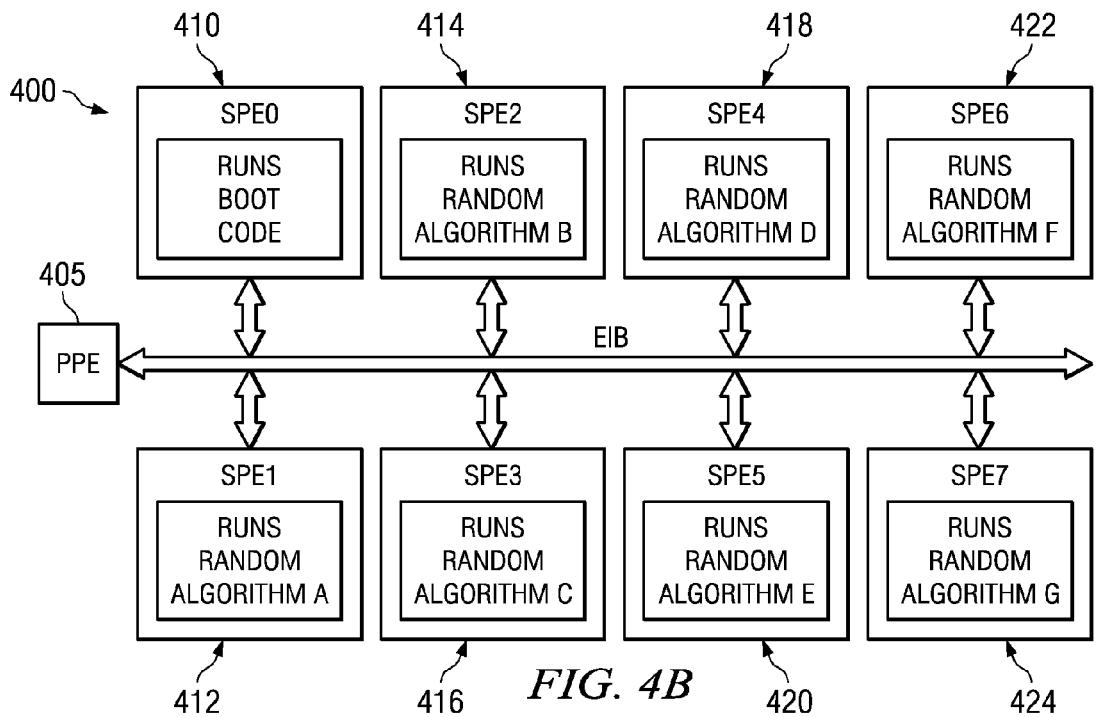

FIG. 4B illustrates another illustrative embodiment in which different randomly selected algorithms are run on each of the non-selected processors. As shown in FIG. 4B, SPE0 is again selected to be the boot processor and thus, runs the boot code for booting the multiprocessor system 400 into an operational state. Each of the other SPEs 412-424 run a separate randomly selected algorithm that generates different thermal profiles and different bus traffic on the EIB. Thus, each SPE0-7 appears to be unique when compared to each of the other SPEs 410-424. Thus, it is not possible to discern which SPE0-7 410-424 is the actual boot processor for booting the multiprocessor system 400.

As mentioned above, these different algorithms may be randomly selected for each of the SPEs 412-424 in the multiprocessor system. Thus, for example, differing start addresses for code sequences stored in an on-chip storage device, e.g., a flash ROM or the like, may be randomly selected and provided to the SPEs 412-424. The SPEs 412-424 may then begin executing instructions at the randomly selected start addresses thereby generating different thermal profiles and bus traffic that masks the actual boot code sequence.

Alternatively, the boot code may be provided to each of the SPEs 410-424 with random delay elements inserted into the boot code. These delay elements may be, for example, loops that iterate a random number of times. This random delay causes the boot code to "look" different on each of the SPEs 410-424 from the perspective of an intruder monitoring the thermal and bus traffic characteristics of the processors. As a result, it is not possible for the intruder to discern which processor is running the actual boot code that boots the multiprocessor system.

FIG. 4C illustrates another illustrative embodiment in which a dummy processor is provided to which attacks from an intruder may be redirected. As shown in FIG. 4C, SPE0 is the randomly selected boot processor executing the boot sequence. SPE1-SPE4 412-418 and SPE6-SPE7 422-424 run code that looks like the boot code sequence from a thermal and bus traffic monitoring perspective, as in the embodiment described above with regard to FIG. 4A. SPE5 420, on the other hand, runs a randomly selected algorithm which may be randomly selected in a similar manner as described above with regard to FIG. 4B.

Thus, from the perspective of an intruder monitoring the characteristics of the processors 410-424, all of the SPE0-SPE4 410-418 and SPE6-SPE7 422-424 look to be executing the same code. SPE5 420, however, appears to be unique from the other SPEs. Hence, an intruder wishing to attack the boot sequence of the multiprocessor system may redirect attacks against SPE5 420 rather than the actual boot processor SPE0 410 since, to the intruder, it appears that SPE5 420 is the actual boot processor.

Just as the actual boot processor is randomly selected with each power-on reset (POR) operation, the dummy processor may be randomly selected from the non-selected processors as well. Thus, with each POR operation, a different boot processor and dummy processor may be selected, thereby making it more difficult for an intruder to deduce which processor is performing an actual boot sequence that may be compromised in order to obtain access to the multiprocessor system.

For completeness, FIG. 4D illustrates the illustrative embodiment previously described above in which the boot code that is used to boot the system is executed by each of the processors. In this illustrative embodiment, only the randomly selected boot processor is given access to the secret key (Skey) while the other processors receive randomly selected keys (Rkey1-Rkey7). Each of the processors attempts to decode and execute the boot code using the key that was supplied to them, e.g., the Skey or an Rkey. Only the randomly selected boot processor will be able to correctly decrypt the boot code and execute it to bring the data processing system into an operational state. However, to an outside monitor, it will appear as if all of the processors are booting the system, thereby masking the actual boot processor, since each of them will be performing similar tasks to attempt to decrypt and boot the system. That is, each of the processors will generate a similar thermal and/or electrical signature that makes it difficult for a would-be intruder to discern which processor is the actual boot processor using measuring probes and the like.

Through the use of the random selection of the boot processor and the masking of the boot sequence, as provided by the illustrative embodiments, it becomes very difficult for any would-be intruder into the multiprocessor system to be able to discern which processor is performing a boot code sequence. Thus, it becomes very difficult for a would-be intruder to monitor thermal profiles and bus traffic of the processors and identify secret key information for use in accessing the encrypted boot code. Moreover, it becomes difficult for a would-be intruder to identify places in the boot code sequence where intrusion into the system is possible. Hence, the multiprocessor system is made more secure from unauthorized access to the boot sequence.

FIGS. 5-6 are flowcharts outlining an exemplary operation for randomly selecting a processor in a multiprocessor system as a boot processor and for masking the boot code sequence. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 5 outlines an exemplary operation for random selection of a boot processor for booting a multiprocessor system. As shown in FIG. 5, the operation starts with the system controller performing a power-on reset (POR) operation (step 510). After performance of the initial POR operations, the system controller provides a "power good" signal to the pervasive logic of the multiprocessor system (step 520) and the pervasive logic initiates a random boot operation (step 530).

The pervasive logic randomly selects a processor from a plurality of processors to be the boot processor (step 540). The pervasive logic then sets the configuration bits of the processors based on the random selection (step 550) and signals the processors to begin the boot operation (step 560). A flash ROM provides the encrypted boot code to the processors and key values are provided to the processors from a secret key storage and random key generator (step 570). The processors then select the keys that are to be used by the processors based on the setting of their configuration bits (step 580). The processors attempt to decrypt the boot code based on the selected keys (step 590). The selected processor decrypts the boot code using the secret key and boots the system (step 595). It should be noted that the attempt to decrypt the boot code by all other non-selected processors will fail and only the selected processor will be able to boot the system. The operation then ends.

FIG. 6 is a flowchart outlining an exemplary operation for masking a boot code sequence in accordance with one illustrative embodiment. The operation outlined in FIG. 6 may be performed in each processor of a multiprocessor system, for example.

As shown in FIG. 6, the processor receives a signal to begin a boot operation (step 610). This step may correspond to step 530 in FIG. 5, for example. The processor attempts to decrypt the boot code (step 620) and a determination is made as to whether the decrypt attempt failed (step 630). If the decrypt was successful, i.e. the processor is the randomly selected boot processor, then the boot code is executed to thereby bring the multiprocessor system to an operational state (step 640).

If the decryption failed, then a code sequence to execute to mask the boot sequence is selected (step 650). As mentioned above, depending upon the particular embodiment, the selection of a masking code sequence may be based on a default code sequence in a secure portion of a local store, a randomly selected starting address, the use of boot code with random delay elements, or the like. The masking code sequence is run (step 660) and a determination is made as to whether the system is in an operational state, i.e. the boot sequence has completed (step 670). If not, the operation returns to step 660 and continues to run the masking code sequence. If the system is in an operational state, then the execution of the masking code sequence is ended (step 680) and the operation terminates.

Thus, the above illustrative embodiments provide a mechanism by which a processor may be randomly selected from a plurality of processors as a boot processor for booting a multiprocessor system to an operational state. The illustrative embodiments further provide a mechanism for masking the boot code sequence being executed by a randomly selected processor so as to make it difficult for an intruder to discern which processor has been randomly selected to execute the actual boot code sequence. Using these mechanisms, a multiprocessor system is made more secure by making it extremely difficult for an intruder to gain access to the system through monitoring the boot code sequence.

The above illustrative embodiments are described in terms of the boot code sequence being performed by a single processor in a multiprocessor system. However, the illustrative embodiments are not limited to such. In other illustrative embodiments, the boot code sequence may be distributed across a plurality of processors in the multiprocessor system, as described hereafter. By distributing the boot code sequence across a plurality of processors in the multiprocessor system, the number of processors that must be compromised in order to obtain complete information about the boot sequence and thereby circumvent security measures is increased.

Thus, the distributed boot operation of the illustrative embodiments described hereafter is more secure than multiprocessor data processing systems that utilize a single secure core. Furthermore, by distributing the boot operation, if any portion of the boot operation is compromised, the boot operation fails, thereby preventing an unauthorized individual from circumventing the security of the system. In other words, while the would-be intruder may compromise a portion of the boot operation, the would-be intruder is not able to compromise the all of the boot operation and thus, is not able to obtain access to the multiprocessor data processing system.

With this illustrative embodiment, the boot code sequence is partitioned into a plurality of partitions such that each partition may be provided to a different processor of the multiprocessor system. As each partition of the boot code sequence is executed, that partition must complete correctly on its respective processor before the boot code sequence may proceed on another processor. A secure communication mechanism is used to communicate satisfactory completion of a previous partition of the boot code sequence. This secure communication mechanism may include a security token, such as an encrypted password or other security identifier, e.g., a public/private encryption key pair, that indicates that the previous session was not compromised. In this way, a chain of dependent "sessions" are created that must complete satisfactorily.

The processors that are involved in the distributed execution of the boot code may be all of the processors in the multiprocessor system or a sub-set of the processors in the multiprocessor system. For example, a random selection mechanism, such as that described above for selecting a single boot processor, may be used to randomly select a plurality of boot processors to be used in booting the system in a distributed manner. Moreover, the particular partitions of the boot code that are executed by the processors may be randomly selected such that, with each power-on reset (POR) operation, the same processor may or may not execute the same boot code partition as in a previous POR operation. Thus, randomization may be performed with regard to which processors are involved in the distributed boot operation as well as with regard to what boot code partitions each processor will execute.

Other processors of the multiprocessor system, i.e. non-boot processors, may either not perform any work during the distributed boot operation or may execute masking code sequences, of one or more of the various masking code illustrative embodiments described previously, to mask the boot code execution on the randomly selected sub-set of processors. In other words, the distributed boot code sequence operation of the present illustrative embodiment may be combined with one or more of the previously described illustrative embodiments without departing from the spirit and scope of the present invention.

Figure 7A:
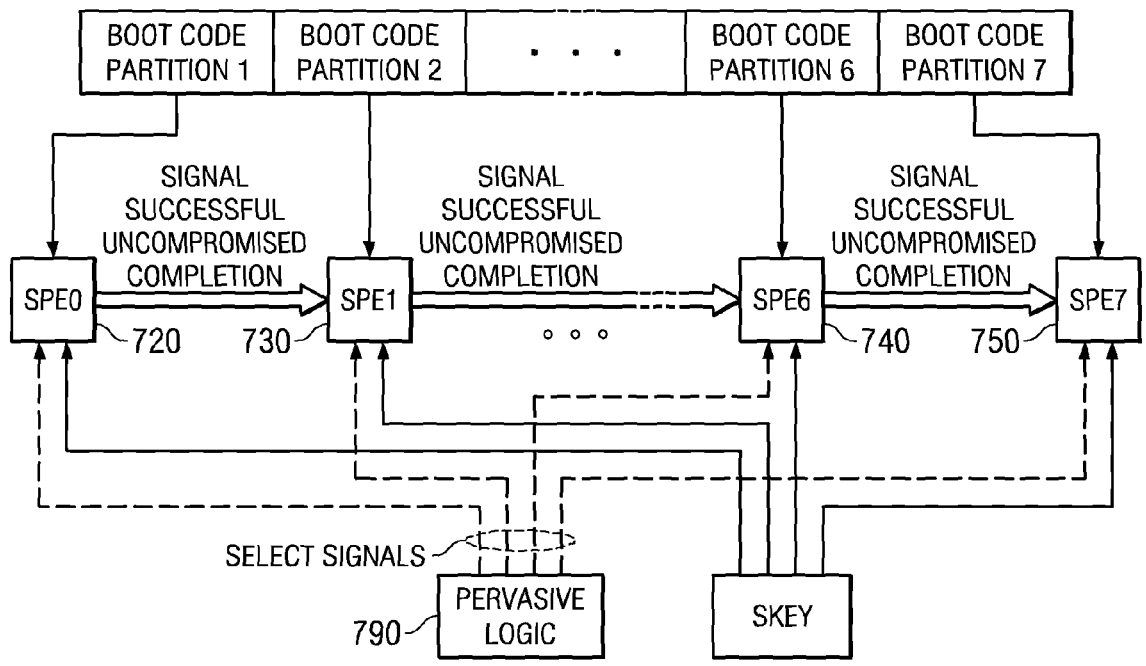
FIG. 7A is an exemplary diagram illustrating a distributed boot operation configured as a daisy chain or ring arrangement in accordance with one illustrative embodiment.

FIG. 7A is an exemplary diagram illustrating a distributed boot operation configured as a daisy chain or ring arrangement in accordance with one illustrative embodiment. As shown in FIG. 7A, a plurality of processors 720-750 are provided for booting the multiprocessor data processing system. In the depicted example, all of the co-processors, i.e. SPEs, are utilized in the distributed boot operation while the control processor, e.g., PPE, does not execute the distributed boot code. Of course, in other illustrative embodiments, the PPE may also be included in the distributed boot operation. Moreover, in other illustrative embodiments, as mentioned previously, only a sub-set of the processors in the multiprocessor data processing system may be used to perform the distributed boot operation.

The encrypted boot code 710, which may be stored in a storage device associated with the multiprocessor data processing system, such as in Flash ROM 230 in FIG. 2, for example, may be partitioned into separately executable partitions, i.e. boot code partitions 1 to n. For example, the partitions may be provided as modules or routines in the encrypted boot code that are separately encrypted using the same encryption algorithm and the same secret key (Skey). Preferably, the number of boot code partitions is equal to the number of processors that will be involved in the distributed boot operation, i.e. the number of boot processors. However, in some illustrative embodiments, such as in a ring arrangement of the boot processors, the number of boot code partitions is not limited the number of boot processors and may be any number of partitions less than or greater than the number of boot processors.

The distributed boot operation is performed under the control of the pervasive logic 790, which may be the same pervasive logic 193 in FIG. 1, for example. The pervasive logic 790, through the user of the random event generator, for example, may randomly select the processors 720-750 to be used as boot processors as well as may randomly select which partition each of the randomly selected processors 720-750 will execute. In such an embodiment, the pervasive logic 790 may keep track of the order in which the boot code partitions are to be executed in order to ensure the security of the boot code sequence through use of a secure communication mechanism that indicates whether or not a previous session of the distributed boot operation has been compromised. For simplicity of the present description, however, it will be assumed that, in the depicted example, all of the processors, or at least the co-processors, of the multiprocessor system are utilized in the distributed boot operation and that boot code partitions are provided to the processors 720-750 in sequential order.

The pervasive logic 790 provides selector signals to the processors 720-750 for selecting which boot code partition is to be executed by each of the processors 720-750. In addition, the pervasive logic 790 provides key value selector signals for causing the processor 720-750 to select the Skey, from Skey storage, as the key to be used to decrypt their corresponding boot code partitions. The processors 720-750 decrypt their boot code partition using the supplied Skey and then execute the boot code partition in the proper sequence either by virtue of the arrangement of the processors 720-750 in a daisy chain architecture or under the control of the pervasive logic 790, for example.

In the depicted example, SPE0 720 begins the distributed boot operation by decrypting its boot code partition 1, executing the boot code partition, and then securely communicating the successful completion of the boot code partition 1 to SPE1 730. Moreover, a security mechanism may be utilized between the SPEs for indicating that the previous session, i.e. the session comprised of the execution of the previous boot code partition, was not compromised. The security mechanism may be, for example, passing a security token, digital signature, password, a checksum of the previous boot code partition, using public key/private key encryption of the successful completion message, or the like. Any security mechanism that may be used to communicate whether or not the previous session of a distributed boot operation was compromised or not is intended to be within the spirit and scope of the present invention.

After receiving confirmation of the successful and uncompromised completion of the boot code partition 1 execution, the SPE1 730 may decrypt its boot code partition 2, execute the boot code partition, and then communicate its successful completion of boot code partition 2 to SPE2 740. This process may continue until all of the processors have signaled that they have completed their portion of the distributed boot operation without being compromised. Any break in this dependency chain of boot code partitions, e.g., any signaling of unsuccessful execution or compromised execution, results in a failed boot which may be signaled to the system controller. Once all of the boot code partitions have completed successfully, the multiprocessor data processing system is in an operative state in which software applications may be executed on the various processors.

The illustrative embodiment described above utilizes a daisy-chain arrangement of the processors with regard to the boot code partitions that are executed on the processors. Other arrangements that ensure a sequential execution of boot code partitions may be utilized without departing from the spirit and scope of the present invention. For example, an extension of the daisy-chain arrangement above is to provide a ring arrangement of the processors with regard to the distributed boot operation such that the last processor, e.g., SPE7 750, communicates back to the first processor, e.g., SPE0 720, which is selected as the "primary" boot processor, its successful and uncompromised completion of execution of its boot code partition. In this way, the security mechanism, e.g., the security token, an incremented count value, etc., which is passed from one session to the next through the ring arrangement may be used at the primary boot processor to verify uncompromised execution of the entire distributed boot operation.

Moreover, a ring arrangement of processors allows a greater number of boot code partitions to be utilized than the number of boot processors. Thus, if only a sub-set of processors in the multiprocessor data processing system are selected to be boot processors, this sub-set of processors may execute any number of boot code partitions when arranged in a ring arrangement with regard to the distributed boot operation. This gives rise to the ability of the pervasive logic 790 to not only randomly select which processors in the multiprocessor data processing system are to be boot processors, but also to randomly select how many processors will be boot processors in the distributed boot operation. Thus, in a first POR operation, four processors may be selected to be boot processors while in a subsequent POR operation three boot processors may be selected. The pervasive logic 790 may contain logic for randomly selecting a number of processors to select to be boot processors which then is used to control the random selection of processors as previously described above.

Figure 7B:
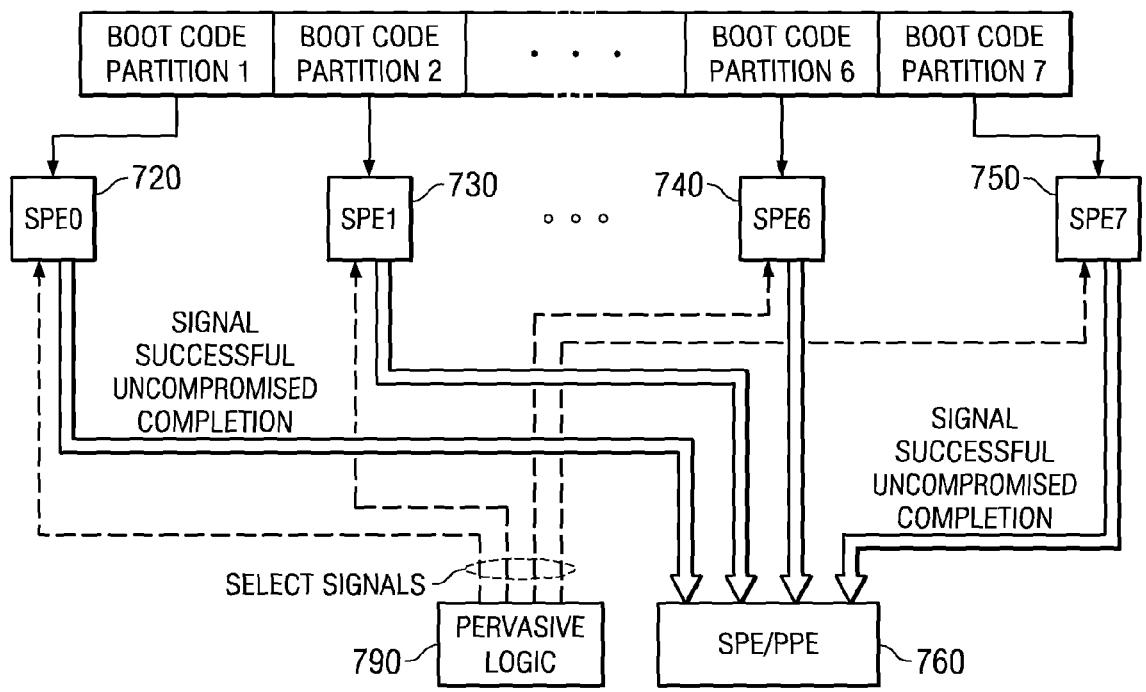
FIG. 7B is an exemplary diagram illustrating a distributed boot operation configured as a master/slave arrangement in accordance with one illustrative embodiment.

Another possible arrangement of boot processors with regard to a distributed boot operation is to provide a master/slave arrangement. FIG. 7B is an exemplary diagram illustrating a distributed boot operation configured as a master/slave arrangement in accordance with one illustrative embodiment. As shown in FIG. 7B, one processor 760 is designated the master processor. This processor may be one of the co-processors, e.g., an SPE, or the control processor, e.g., the PPE. The slave processors, e.g., SPE0-SPE7 720-750, each are responsible for completing their boot code partition and securely communicating to the master core that they have finished execution and have not been compromised, in a similar manner as described above in FIG. 7A. Once the master processor 760 has received signals from each of the slave processors 720-750, and validated that it has not been compromised itself, then the multiprocessor data processing system is permitted to enter an operational state in which software applications may be executed.

It should be appreciated that while a daisy-chain, ring, and master/slave arrangement of processors with regard to a distributed boot operation have been described herein, the present invention is not limited to only these described arrangements. Rather any arrangement of processors with regard to a distributed boot operation may be used with the mechanisms of the illustrative embodiments without departing from the spirit and scope of the present invention.

Figure 8:
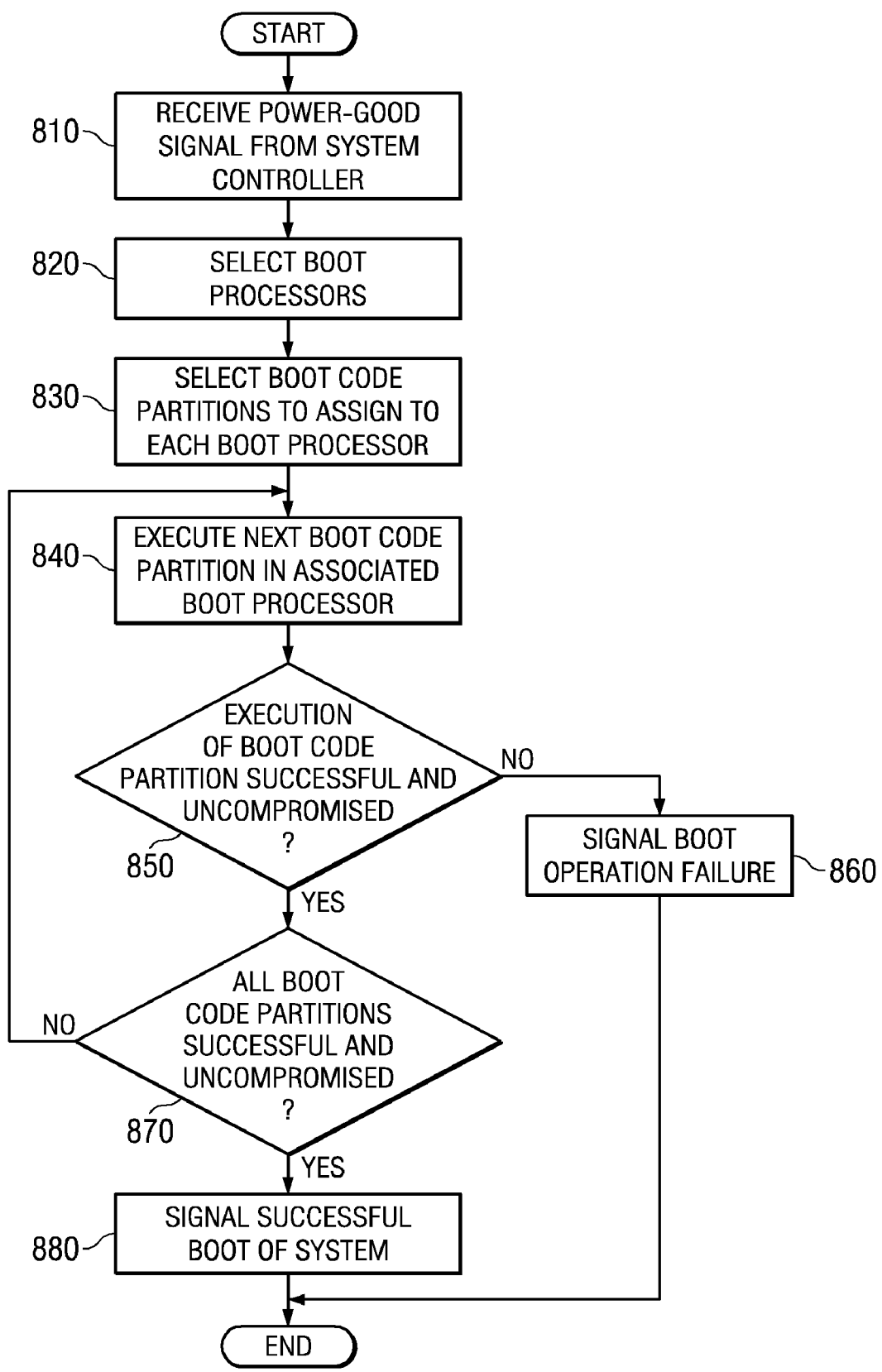
FIG. 8 is a flowchart outlining an exemplary operation for distributed booting of a multiprocessor system in accordance with one illustrative embodiment.

FIG. 8 is a flowchart outlining an exemplary operation for distributed booting of a multiprocessor system in accordance with one illustrative embodiment. As shown in FIG. 8, the operation starts with the pervasive logic receiving a "power good" signal from the system controller (step 810). The pervasive logic selects the processors to be boot processors from the plurality of processors in the multiprocessor data processing system (step 820). As mentioned above, such selection may result in all of the processors being selected or some sub-set of the processors in the multiprocessor data processing system being selected to be boot processors. Such selection may be performed using a random event generator in the pervasive logic, for example.

The pervasive logic selects the boot code partitions to be assigned to the selected boot processors (step 830). A next boot code partition is executed by an associated boot processor (step 840). The boot processor determines whether the execution of the boot code partition was successful and uncompromised (step 850). If not, a boot failure is signaled to the system controller (step 860) and the operation terminates.

If the boot code partition executes successfully and is not compromised, then the boot processor determines if the all boot code partitions have been executed successfully (step 870). If not, the operation returns to step 840 and the next boot code partition is executed by its associated boot processor. If all of the boot code partitions have been executed successfully, the boot processor signals the successful boot of the data processing system to the system controller (step 880) and the operation terminates.

Thus, as set forth above, the illustrative embodiments, in addition to randomly selecting a single boot processor and performing masking operations on other processors of the multiprocessor data processing system, provides mechanisms for distributing the boot operation over a plurality of processors. The illustrative embodiments provide mechanisms for randomly selecting boot processors, randomly selecting boot code partitions to be executed on selected boot processors, and to ensure the security of the execution of the boot code partitions by the various boot processors. All of these various mechanisms aid is increasing the security of the multiprocessor data processing system from unauthorized monitoring of the boot operation.

The illustrative embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The circuits as described above may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design may then be converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

The resulting integrated circuit chips may be distributed by the fabricator in raw wafer form (that is, as a single wafer that has multiple unpackaged chips), as a bare die, or in a packaged form. In the latter case the chip may be mounted in a single chip package (such as a plastic carrier, with leads that are affixed to a motherboard or other higher level carrier) or in a multichip package (such as a ceramic carrier that has either or both surface interconnections or buried interconnections). In any case the chip may then be integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a plurality of processors, for booting the data processing system, comprising:
    partitioning boot code for booting the data processing system into a plurality of boot code partitions to be executed in a distributed boot sequence;
    loading, in each of a plurality of boot processors within the plurality of processors of the data processing system, a boot code partition from the plurality of boot code partitions; and
    executing the plurality of boot code partitions on their respective associated boot processors as a plurality of sessions in the distributed boot sequence to thereby boot the data processing system,
    wherein, as execution of each boot code partition in its associated session is completed, an associated boot processor of the plurality of processors that executed the boot code partition signals, to another boot processor associated with a next boot code partition in the distributed boot sequence, the successful completion of the boot code partition;
    wherein if any session results in unsuccessful or compromised execution of a boot code partition, booting of the data processing system fails; and
    wherein if all sessions in the distributed boot sequence are successful, booting of the data processing system continues.

2. The method of claim 1, wherein executing the plurality of boot code partitions on their respective associated boot processors comprises:
    utilizing a security mechanism on communications between boot processors to ensure uncompromised execution of the plurality of boot code partitions on their respective associated boot processors.

3. The method of claim 2, wherein the security mechanism comprises at least one of passing a security token between boot processors, passing a digital signature between boot processors, using a password, passing a checksum of a boot code partition, or using public key/private key encryption of the signals.

4. The method of claim 1, wherein a number of boot code partitions is greater than a number of boot processors, wherein at least one of the plurality of boot processors executes more than one of the plurality of boot code partitions in the distributed boot sequence.

5. The method of claim 1, further comprising:
    randomly selecting the boot processors from the plurality of processors, wherein the boot processors are a sub-set of the plurality of processors.

6. The method of claim 5, further comprising:
    executing masking code on processors of the plurality of processors that were not randomly selected to be boot processors.

7. The method of claim 1, further comprising:
    randomly selecting which boot code partition is associated with each boot processor, wherein each boot code partition is different from other boot code partitions.

8. The method of claim 1, wherein the data processing system is a heterogeneous multiprocessor system-on-a-chip having a first processor the operates according to a first instruction set and one or more second processors that operate according to a second instruction set different from the first instruction set.

9. A data processing system comprising:
    a plurality of processors;
    a boot code storage coupled to the plurality of processors, wherein the boot code storage stores boot code for booting the data processing system that is partitioned into a plurality of boot code partitions to be executed in a distributed boot sequence; and
    pervasive logic coupled to the plurality of processors, wherein the pervasive logic loads, in each of a plurality of boot processors within the plurality of processors of the data processing system, a boot code partition from the plurality of boot code partitions, and wherein the plurality of boot code partitions are executed on their respective associated boot processors as a plurality of sessions in the distributed boot sequence to thereby boot the data processing system,
    wherein, as execution of each boot code partition in its associated session is completed, an associated boot processor of the plurality of processors that executed the boot code partition signals, to another boot processor associated with a next boot code partition in the distributed boot sequence, the successful completion of the boot code partition;
    wherein if any session results in unsuccessful or compromised execution of a boot code partition, booting of the data processing system fails; and
    wherein if all sessions in the distributed boot sequence are successful, booting of the data processing system continues.

10. The system of claim 9, wherein a security mechanism is utilized in communications between boot processors to ensure uncompromised execution of the plurality of boot code partitions.

11. The system of claim 10, wherein the security mechanism comprises at least one of passing a security token between boot processors, passing a digital signature between boot processors, using a password, passing a checksum of a boot code partition, or using public key/private key encryption of the signals.

12. The system of claim 9, wherein a number of boot code partitions is greater than a number of boot processors, wherein at least one of the plurality of boot processors executes more than one of the plurality of boot code partitions in the distributed boot sequence.

13. The system of claim 9, wherein the pervasive logic randomly selects the boot processors from the plurality of processors, and wherein the boot processors are a sub-set of the plurality of processors.

14. The system of claim 13, wherein processors of the plurality of processors that were not randomly selected to be boot processors execute masking code.

15. The system of claim 9, wherein the pervasive logic randomly selects which boot code partition is associated with each boot processor, and wherein each boot code partition is different from other boot code partitions.

16. A computer program product comprising a computer storage device having a computer readable program stored thereon, wherein the computer readable program, when executed on a data processing system, causes the data processing system to:
- partition boot code for booting the data processing system into a plurality of boot code partitions to be executed in a distributed boot sequence;
- load, in each of a plurality of boot processors, a boot code partition from the plurality of boot code partitions; and
- execute the plurality of boot code partitions on their respective associated boot processors as a plurality of sessions in the distributed boot sequence to thereby boot the data processing system,
- wherein, as execution of each boot code partition in its associated session is completed, an associated boot processor of the plurality of processors that executed the boot code partition signals, to another boot processor associated with a next boot code partition in the distributed boot sequence, the successful completion of the boot code partition;
- wherein if any session results in unsuccessful or compromised execution of a boot code partition, booting of the data processing system fails; and
- wherein if all sessions in the distributed boot sequence are successful, booting of the data processing system continues.

* * * * *